(12) United States Patent
Gookins

(10) Patent No.: US 6,530,160 B1
(45) Date of Patent: Mar. 11, 2003

(54) METHOD AND MEANS FOR GRAIN DRYING OPTIMIZATION

(75) Inventor: William L. Gookins, 2847 N. Krug Rd., Attica, IN (US) 47918

(73) Assignee: William L. Gookins, Attica, IN (US)

(*) Notice: Subject to any disclaimer, the term of this patent is extended or adjusted under 35 U.S.C. 154(b) by 0 days.

(21) Appl. No.: 09/572,732

(22) Filed: May 17, 2000

(51) Int. Cl.[7] .................................................. F26B 7/00
(52) U.S. Cl. ........................................... 34/418; 34/495
(58) Field of Search ............................ 34/418, 491, 495, 34/531

(56) References Cited

U.S. PATENT DOCUMENTS

| | | | |
|---|---|---|---|
| 6,550 A | 6/1849 | Pattern | |
| 53,293 A | 3/1866 | Godfrey | |
| 2,235,748 A | 3/1941 | Hukill | |
| 4,253,244 A | 3/1981 | Kranzler | |
| 4,293,854 A | 10/1981 | Gookins et al. | |
| 4,386,471 A | 6/1983 | Bowrey et al. | |
| 4,522,335 A | 6/1985 | Kallestad et al. | |
| 4,558,523 A | * 12/1985 | Isbell et al. | 34/491 |
| 4,583,300 A | 4/1986 | Mast | |
| 4,688,332 A | 8/1987 | Kallestad et al. | |
| 4,750,273 A | 6/1988 | Parks et al. | |
| 4,800,653 A | * 1/1989 | Steffen | 34/495 |
| 4,896,795 A | 1/1990 | Edgier et al. | |
| 4,930,229 A | 6/1990 | Moser | |
| 5,050,313 A | 9/1991 | Wakaeya et al. | |
| 5,144,755 A | 9/1992 | Braun et al. | |
| 5,156,570 A | 10/1992 | Justice | |
| 5,526,581 A | 6/1996 | Winterson et al. | |
| 5,551,167 A | 9/1996 | Fossen | |
| 5,551,168 A | 9/1996 | Fossen | |
| 5,651,193 A | * 7/1997 | Rhodes et al. | 34/531 |

OTHER PUBLICATIONS

Dr. Robert Peart, "Improving Crop Drying Efficiencies With New Technology", Aug. 1984.
Donald B. Brooker, Fred W. Bakker–Arkema, C.W. Hall, "Drying and Storage Of Grains And Oilseeds" (633.1046b791ds), 1982.
B.E. Lynch and R. Vance Morey, "Control Strategies For Ambient Air Corn Drying", 1989.
"Particle Analysis by Laser Mass Spectrometer, Scientific Computing and Instrumentation", Jul. 1999, pp. 54–57, published by Cahners, www.scimag.com. 1997 Ashrae Handbook—Fundamentals (p. 11.8 in Drying Theory section).
Harold L. Reed, "Brains For Machines—Animates", May–Jun. 1997 issue of Midnight Engineering; William Gates, editor, Rocky Ford, CO, 81067.
David Howarth, "Performing Data Acquisition Over The Internet", Sensors, Jan. 1998, pp. 49–51, Keithley Instruments.
Tomas A. Lutz, "Using TCP/IP As An Instrument Interface", Sensors, Jul. 1998, pp. 43–46.
John Bower, "Understanding Ventilation", 697.9 B786U, 1995, published by the Healthy House Institute.

(List continued on next page.)

Primary Examiner—Teresa Walberg
Assistant Examiner—Leonid M Fastovsky
(74) Attorney, Agent, or Firm—Shinjyu Global IP Counselors, LLP

(57) ABSTRACT

A method for drying grain in a bin is provided. The method includes gathering temperature and moisture data from various points in and around the bin. The data are integrated with a quantitative algorithm of direct differential vapor pressure analysis. The grain is then conditioned in response to results obtained from the quantitative algorithm of differential vapor pressure analysis.

34 Claims, 17 Drawing Sheets

OTHER PUBLICATIONS

J.D. Babbitt, "Observations On The Permeability Of Hygroscopic Materials To Water Vapor", Canadian Journal of Research, 1940.

H. Nissan and W.G. Kaye, "An Analytical Approach To The Problem Of Drying Of Thin Fibrous Sheets On Multicylinder Machines", TAPPI, Jul. 1955, vol. 38, No. 7, pp. 385–395, Tappi stands for Technical Association of the Pulp and Paper Industry.

J.K. Wang and C.W. Hall, "Moisture Movement in Hygroscopic Materials—A Mathematical Analysis", Transactions of the ASAE, 1961.

Irving Granet,"Elementary Applied Thermodynamics", John Wiley & Sons, 1965 Library of Congress No. 65–16410, p. 27.

Albert Weiss, "Calculation Of Moist Air Properties On A Hand Calculator", Transaction ASAE, Mar. 1977, p. 1133–1136.

O.R.Kunze, "Fissuring Of The Rice Grain After Heated Air Drying", Transactions of the ASAE, 1979, p. 1198.

Federal Grain Inspection Service clarification, Successful Farming, Aug. 1997, p. 64.

Mark Stuart, "Using Hydrophobic Membranes To Protect Gas Sensors", Sensors, May 1998, P14–20, p. 19.

John Bower, "Understanding Ventilation", 697.9, B786U, 1995 published by the Healthy House Institute.

* cited by examiner

| University Data | | | Cooper | Sensors | | | |
|---|---|---|---|---|---|---|---|
| Date & Time | DB-Inlet | DP-Inlet | RH% | GT | DB-Exit | DP-Exit | WR |
| | | | | | | | |
| | | Typical warming | | | | | |
| 10/28/94 11:23 | 58.5 | 34.5 | 40.3 | 42.4 | 47.1 | 44.9 | 2.4 |
| 10/28/94 12:23 | 59.2 | 33.8 | 38.2 | 42.3 | 44.8 | 44 | 2.3 |
| 10/28/94 13:23 | 58.4 | 33.1 | 38.3 | 43.8 | 44.2 | 43.6 | 2.3 |
| 10/28/94 14:23 | 56.3 | 33.1 | 41.3 | 44.7 | 44 | 43.7 | 2.4 |
| 10/28/94 15:23 | 51.6 | 32.3 | 47.4 | 45.4 | 44 | 43.7 | 2.5 |
| | | | | | | | |
| | | Strategic Cooling | | | | | |
| 11/1/94 21:23 | 33.4 | 31.3 | 91.9 | 60.4 | 57.6 | 57.6 | 7.8 |
| 11/1/94 22:23 | 35 | 33.1 | 92.7 | 60.7 | 56 | 55.6 | 6.6 |
| 11/1/94 23:23 | 34.3 | 34.2 | 99.6 | 60.5 | 56.8 | 56.4 | 6.7 |
| 11/2/94 0:23 | 33.9 | 33.8 | 99.6 | 59.9 | 57.6 | 57.2 | 7.1 |
| 11/2/94 1:23 | 36.5 | 35.9 | 97.6 | 58.2 | 58.3 | 57.9 | 7 |
| 11/2/94 2:23 | 34.2 | 33.9 | 98.8 | 55.4 | 58.2 | 57.8 | 7.4 |
| 11/2/94 3:23 | 33.5 | 33.2 | 98.8 | 52.4 | 57.5 | 57.1 | 7.2 |
| 11/2/94 4:23 | 33.5 | 32.4 | 95.7 | 48.9 | 55.6 | 55.2 | 6.6 |
| 11/2/94 5:23 | 33.5 | 31.4 | 91.9 | 45.3 | 53.8 | 53.1 | 5.9 |
| 6:00 am off peak simulation time | | | | | | | |
| | | Re-warming | | | | | |
| 11/2/94 9:23 | 54.5 | 36.4 | 50.3 | 44.5 | 51 | 51 | 4.7 |
| 11/2/94 10:23 | 59.9 | 41.8 | 51.1 | 41.8 | 51 | 51 | 3.4 |
| 11/2/94 11:23 | 65.1 | 41.5 | 42.1 | 39.3 | 51 | 49.6 | 2.3 |
| 11/2/94 12:23 | 64.9 | 36.7 | 35.1 | 38.7 | 50.7 | 50.1 | 3.5 |
| 11/2/94 13:23 | 65.1 | 28.8 | 25.4 | 37.9 | 49.8 | 49.4 | 4.7 |
| 11/2/94 14:23 | 67 | 28.4 | 23.3 | 37.6 | 46.5 | 45.9 | 3.7 |
| 11/2/94 15:23 | 66.3 | 28.8 | 24.3 | 37.3 | 44.2 | 43.6 | 3 |
| 11/2/94 16:23 | 65 | 27.8 | 24.4 | 37.1 | 42.9 | 42.4 | 2.9 |
| 11/2/94 17:23 | 60.6 | 26.1 | 26.6 | 37.4 | 41.1 | 40.6 | 2.7 |
| 6pm-9pm shut down | | | | | | | |
| Air was so moist that the incoming DP was higher than the grain temperature -GT | | | | | | | |
| 11/3/94 9:23 | 63.2 | 43.7 | 48.9 | 46.8 | 49.4 | 49.1 | |
| 11/3/94 10:23 | 66 | 50.2 | 56.7 | 46.2 | 49.3 | 49 | |
| | | | | | | | |
| | | Another Strategic Cooling | | | | | |
| 11/6/94 22:23 | 39.9 | 39.4 | 98.1 | 53.3 | 50.7 | 49.8 | 2.9 |
| 11/6/94 23:23 | 38.6 | 38.4 | 98.2 | 54.9 | 50.2 | 49.3 | 3 |
| 11/7/94 0:23 | 37.2 | 36.8 | 98.4 | 57.2 | 50 | 49.4 | 3.4 |
| 11/7/94 1:23 | 37.4 | 37.2 | 99.2 | 60.2 | 50.2 | 49.6 | 3.4 |
| 11/7/94 2:23 | 34.3 | 34 | 98.8 | 60.1 | 51.2 | 50.8 | 4.6 |
| 11/7/94 3:23 | 34.1 | 33.8 | 98.8 | 57.1 | 52.6 | 52.6 | 5.1 |
| 11/7/94 4:23 | 36 | 35.7 | 98.8 | 53.3 | 54 | 54 | 5.4 |
| 11/7/94 5:23 | 36.1 | 36 | 99.6 | 51.7 | 54 | 54 | 5.3 |
| 11/7/94 6:23 | | | 6:00 AM shut down | | | | |

Fig. 1

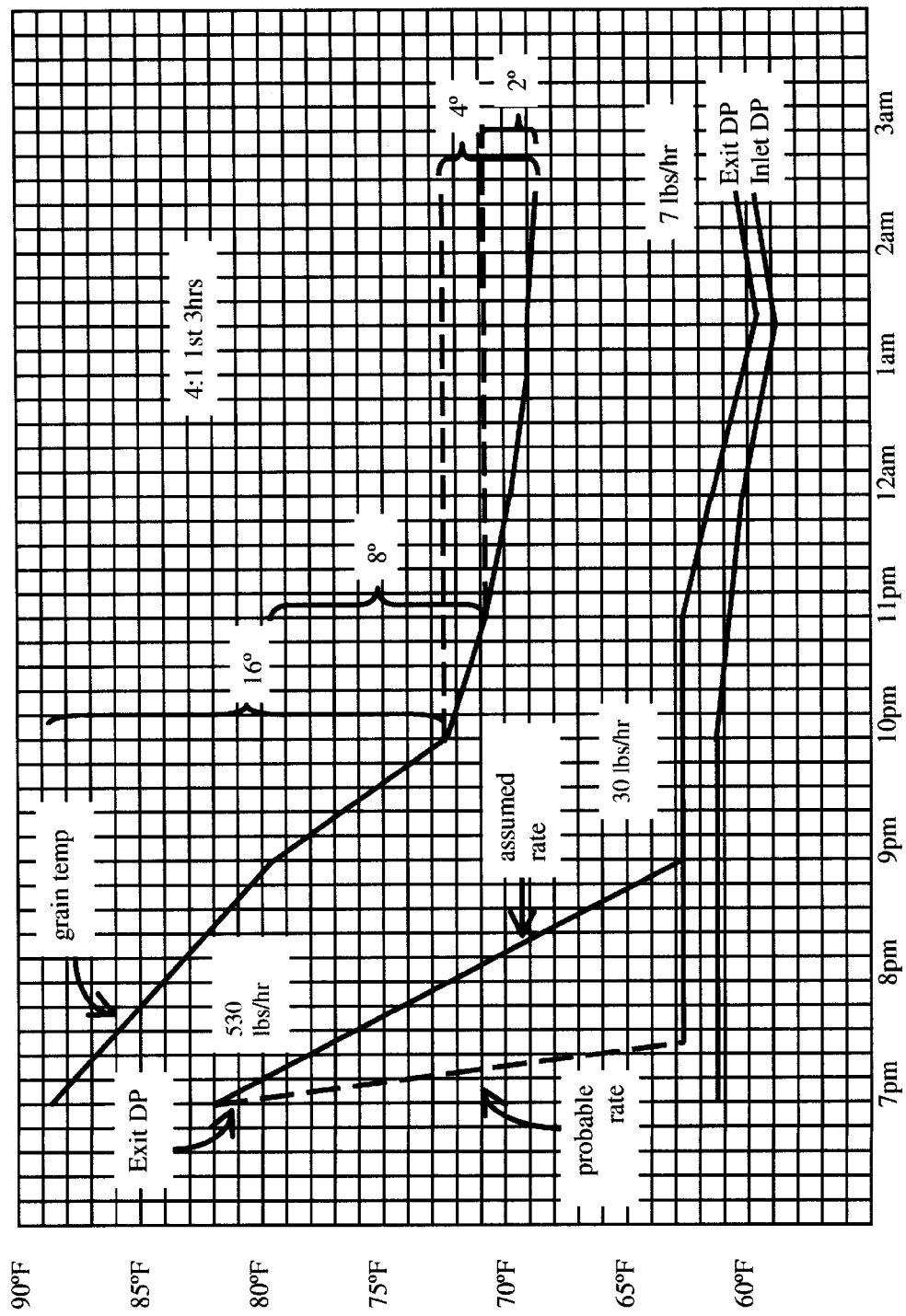
Fig. 1-a

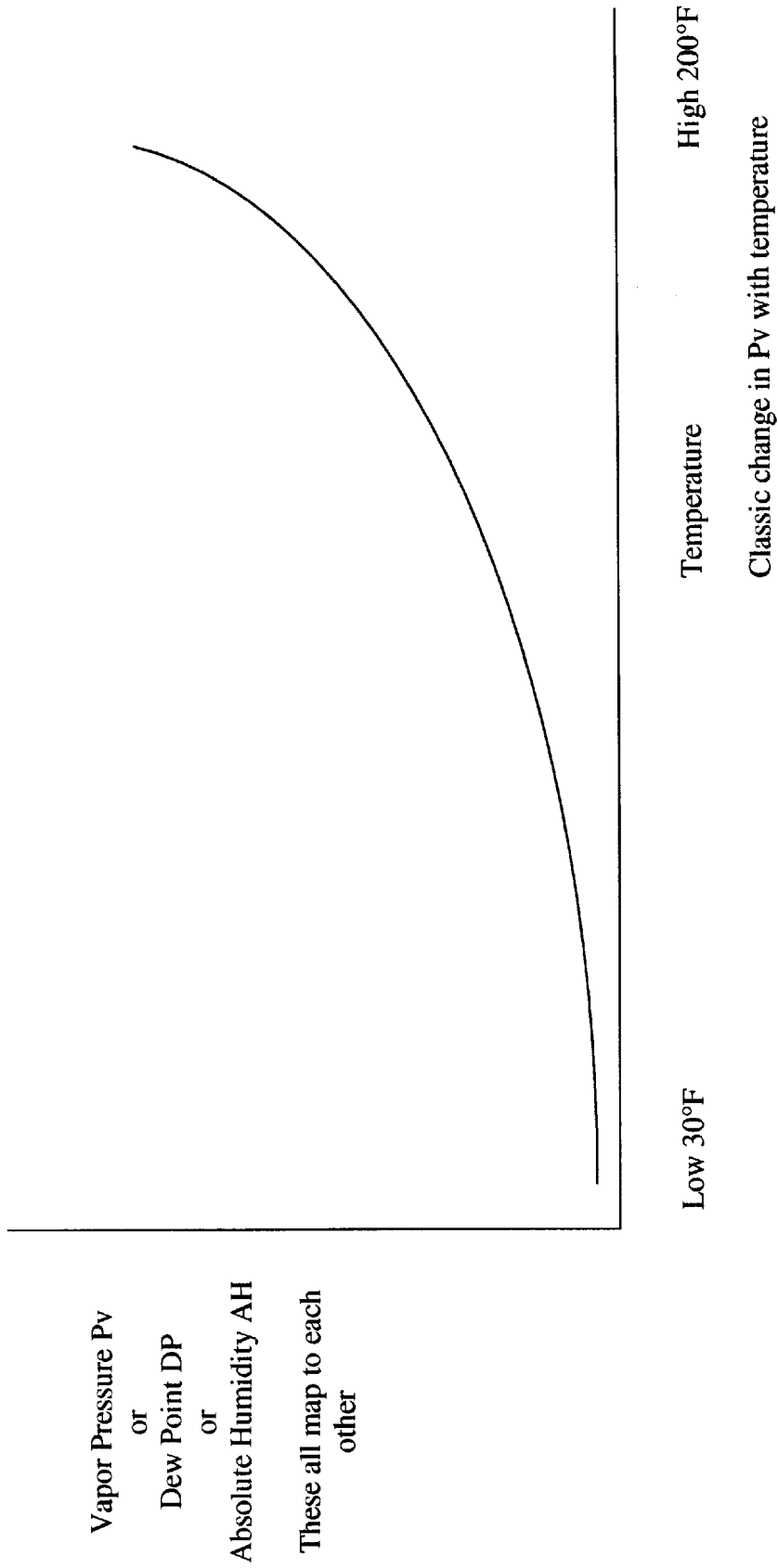
Fig. 1-b

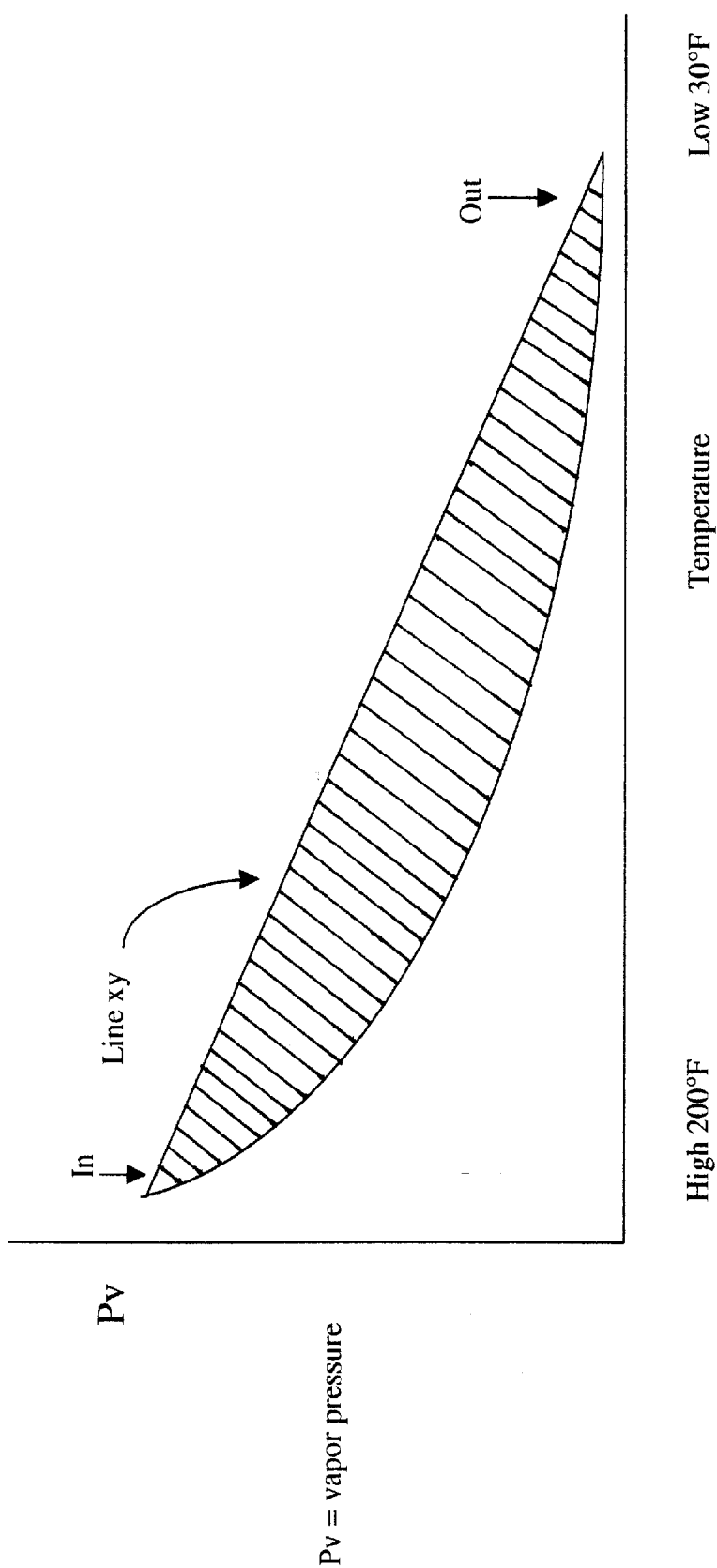
Fig. 1-c

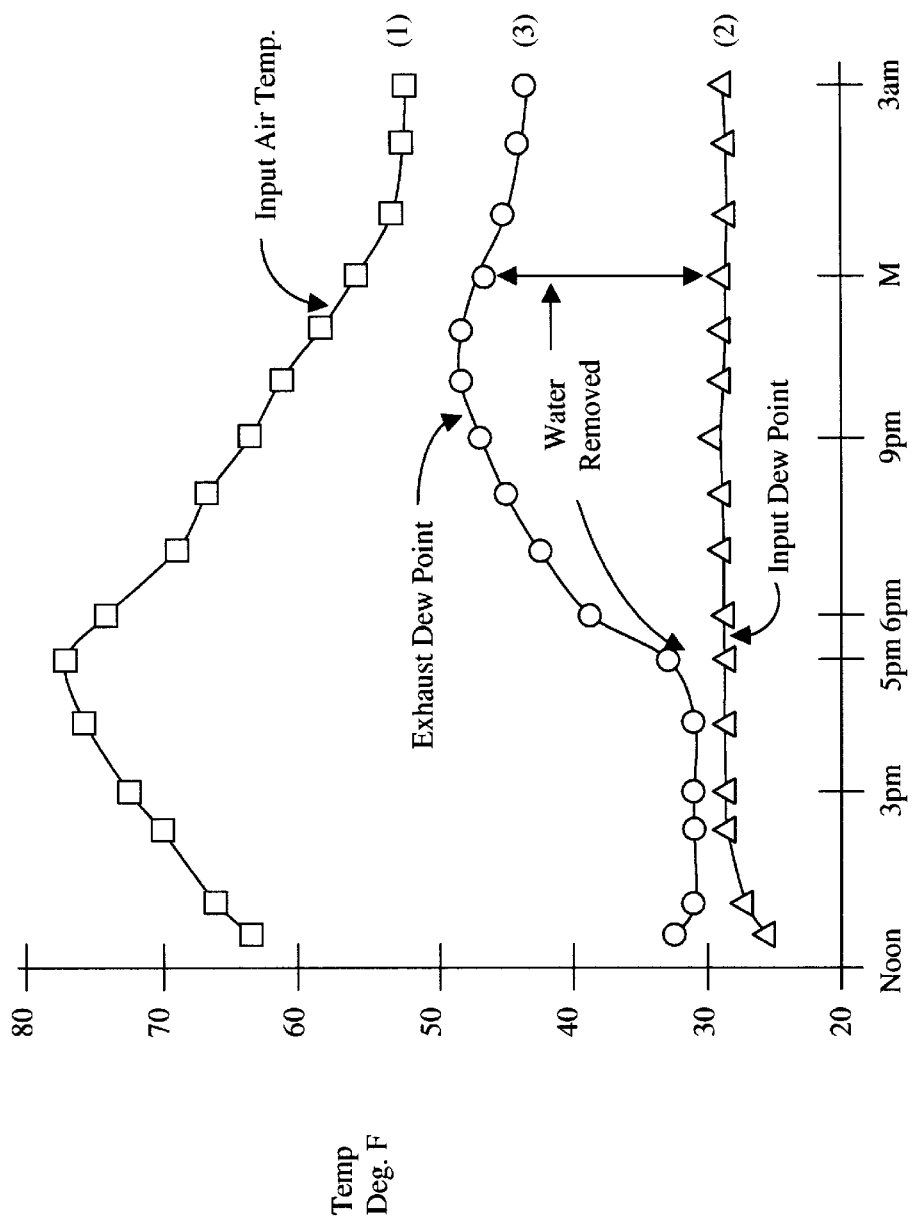
Fig. 1-d

EQUILIBRIUM MOISTURE CONTENT, DURUM WHEAT (Adapted From *Agricultural Engineers Yearbook* - 1982)

EQUILIBRIUM MOISTURE CONTENT, SOFT WHEAT
(Adapted From Agricultural Engineers Yearbook - 1982)

EQUILIBRIUM MOISTURE CONTENT EQUATIONS AND CONSTANTS

*(Adapted From Agricultural Engineers Yearbook - 1982)*
Modified Henderson Equation $$M = \left[ \frac{\ln(1-RH)}{-K \cdot (T+C)} \right]^{\frac{1}{N}} \cdot \frac{1}{100}$$

$$RH = 1 - \exp[-K \cdot (T+C) \cdot (100 \cdot M)^N]$$

M=Grain Moisture, decimal dry basis
RH=Relative Humidity, decimal
T=Temperature, °C

| Grain | K | 1/N | N | C | Standard Error Moisture |
|---|---|---|---|---|---|
| Barley | 2.2919 x10$^{-5}$ | | 2.0123 | 195.267 | 0.0080 |
| Beans, edible | 2.0899 | | 1.8812 | 254.23 | 0.0138 |
| Corn, yellow dent | 8.6541 | .536653 | 1.8634 | 49.810 | 0.0127 |
| Peanut, kernel | 65.0413 | | 1.4984 | 50.561 | 0.0126 |
| Peanut, pod | 6.6587 | | 2.5362 | 23.318 | 0.0303 |
| Rice, rough | 1.9187 | | 2.4451 | 51.161 | 0.0097 |
| Sorghum | 0.8532 | .403926 | 2.4757 | 113.725 | 0.0087 |
| Soybean | 30.5327 | .822040 | 1.2164 | 134.136 | 0.0173 |
| Wheat, durum | 2.5738 | | 2.2110 | 70.318 | 0.0068 |
| Wheat, hard | 2.3007 | | 2.2857 | 55.815 | 0.0071 |
| Wheat, soft | 1.2299 | .341267 | 2.5558 | 64.346 | 0.0122 |
| Popcorn, yellow | 17.639 | | 1.3372 | 132.28 | 0.0159 |

Fig. 2d (Prior Art)

EQUILIBRIUM MOISTURE CONTENT EQUATIONS AND CONSTANTS (Adapted From *Agricultural Engineers Yearbook* - 1982)
Chung Equation M=Grain Moisture, decimal dry basis
RH=Relative Humidity, decimal
T=Temperature, °C $$E = \frac{\ln(A)}{B} \qquad F = \frac{1}{B} \qquad M = E - F \cdot \ln[-(T+C) \cdot \ln(RH)]$$

$$RH = \exp\left[\frac{-A}{(T+C)} \exp(-B \cdot M)\right]$$

| Grain | A | B | C | E | F | Standard Error Moisture |
|---|---|---|---|---|---|---|
| Barley | 761.66 | 19.889 | 91.323 | 0.33363 | 0.050279 | 0.0055 |
| Beans, edible | 962.58 | 15.975 | 160.629 | 0.43001 | 0.062596 | 0.0136 |
| Corn, yellow dent | 312.30 | 16.958 | 30.205 | 0.33872 | 0.058970 | 0.0121 |
| Peanut, kernel | 254.90 | 29.243 | 33.892 | 0.18948 | 0.034196 | 0.0133 |
| Peanut, pod | 522.01 | 37.903 | 12.354 | 0.16510 | 0.026383 | 0.0322 |
| Rice, rough | 594.61 | 21.732 | 35.703 | 0.29394 | 0.046015 | 0.0096 |
| Sorghum | 1099.67 | 19.644 | 102.849 | 0.35649 | 0.050907 | 0.0086 |
| Soybean | 328.30 | 13.917 | 100.288 | 0.41631 | 0.071853 | 0.0191 |
| Wheat, durum | 921.65 | 18.077 | 112.350 | 0.37761 | 0.055318 | 0.0057 |
| Wheat, hard | 529.43 | 17.609 | 50.998 | 0.35616 | 0.056788 | 0.0061 |
| Wheat, soft | 726.49 | 23.607 | 35.662 | 0.27908 | 0.042360 | 0.0147 |
| Popcorn, yellow | 234.41 | 12.545 | 51.758 | 0.43499 | 0.079711 | 0.0153 |

Fig. 2e (Prior Art)

Equilibrium Relative Humidity (ERH) : <u>Henderson's</u> Equation for Corn grain temperature, F to C  Constants: for yellow dent Corn  hc=49.810  hk=8.6541·10$^{-5}$  hn=1.8634

$G(gt)=(gt-32)\cdot \frac{5}{9}$   grain moisture (gm), wb to dry basis=md   $md(gm)=\frac{gm\cdot 100}{100-gm}$ grain moisture 15.5% wb      3-2 $ERH(gt)=1-exp[-hk\cdot(G(gt)+hc)\cdot md(gm)^{hn}]$ Saturation Pressures-PS from grain temperature=Ps(gt)

Ps constants   a≡0.61078   b≡17.2693882   c≡6.894757   d≡237.31

3-1 $Ps(gt) = \dfrac{a\cdot exp\left[\dfrac{b\cdot G(gt)}{G(gt)+d}\right]}{c}$

Partial Pressures - Pv from ERH times Ps $Pv(gt)=Ps(gt)\cdot ERH(gt)$ $Pv_{si}(gt)=Pv(gt)\cdot c$ Dew point temperature of grain from Pv $Ac(gt)=ln(Pv_{si}(gt))$ $DP(gt)=(6.983+14.38\cdot Ac(gt)+1.079\cdot Ac(gt)^2)\cdot \frac{9}{5}+32$     $gap(gt)=gt-DP(gt)$ $ERH(gt)=ERH(gt)\cdot 100$ gt=30, 35..100        gm≡15.5(wb)

| gt | DP(gt) | gap(gt) | ERH(gt) |
|----|--------|---------|---------|
| 30 | 19.3 | 10.71 | 61.4 |
| 35 | 24.5 | 10.51 | 63.5 |
| 40 | 29.7 | 10.26 | 65.4 |
| 45 | 35 | 9.98 | 67.2 |
| 50 | 40.3 | 9.68 | 69 |
| 55 | 45.6 | 9.35 | 70.6 |
| 60 | 51 | 9.02 | 72.2 |
| 65 | 56.3 | 8.68 | 73.6 |
| 70 | 61.7 | 8.34 | 75 |
| 75 | 67 | 8 | 76.4 |
| 80 | 72.3 | 7.66 | 77.6 |
| 85 | 77.7 | 7.34 | 78.8 |
| 90 | 83 | 7.03 | 79.9 |
| 95 | 88.3 | 6.74 | 81 |
| 100 | 93.5 | 6.46 | 82 |

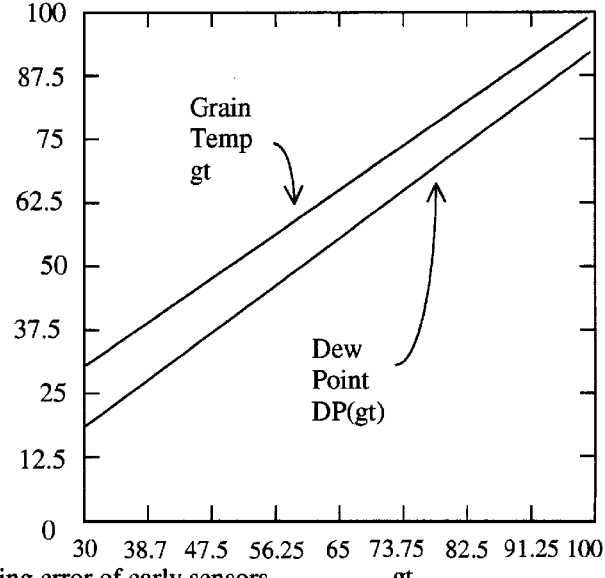

A gap of 8 +/- 2 was probably within the reading error of early sensors

Fig. 3

Equilibrium Relative Humidity (ERH) : <u>Henderson's</u> Equation for Corn grain temperature, F to C  Constants: for yellow dent Corn  hc=49.810  hk=8.6541·10$^{-5}$  hn=1.8634

$G(gt)=(gt-32) \cdot \frac{5}{9}$   grain moisture (gm), wb to dry basis=md   $md(gm)= \frac{gm \cdot 100}{100-gm}$ grain moisture 21.5%, wb   $ERH(gt)=1-\exp[-hk \cdot (G(gt)+hc) \cdot md(gm)^{hn}]$ Saturation Pressures-PS from grain temperature=Ps(gt)

Ps constants   a≡0.61078   b≡17.2693882   c≡6.894757   d≡237.31

$$Ps(gt) = \frac{a \cdot \exp\left[\dfrac{b \cdot G(gt)}{G(gt)+d}\right]}{c}$$

Partial Pressures - Pv from ERH times Ps $Pv(gt)=Ps(gt) \cdot ERH(gt)$ $Pv_{si}(gt)=Pv(gt) \cdot c$ Dew point temperature of grain from Pv $Ac(gt)=\ln(Pv_{si}(gt))$ $DP(gt)=(6.983+14.38 \cdot Ac(gt)+1.079 \cdot Ac(gt)^2) \cdot \frac{9}{5}+32$   $gap(gt)=gt-DP(gt)$ $ERH(gt)=ERH(gt) \cdot 100$ gt=30, 35..100   gm≡21.5

| gt | DP(gt) | gap(gt) | ERH(gt) |
|----|--------|---------|---------|
| 30 | 27     | 3.01    | 86.6    |
| 35 | 32.1   | 2.88    | 88.1    |
| 40 | 37.3   | 2.72    | 89.4    |
| 45 | 42.4   | 2.56    | 90.5    |
| 50 | 47.6   | 2.38    | 91.5    |
| 55 | 52.8   | 2.19    | 92.5    |
| 60 | 58     | 2.01    | 93.3    |
| 65 | 63.2   | 1.83    | 94      |
| 70 | 68.3   | 1.65    | 94.7    |
| 75 | 73.5   | 1.48    | 95.2    |
| 80 | 78.7   | 1.33    | 95.8    |
| 85 | 83.8   | 1.18    | 96.2    |
| 90 | 88.9   | 1.05    | 96.6    |
| 95 | 94.1   | 0.94    | 97      |
| 100| 99.1   | 0.85    | 97.3    |

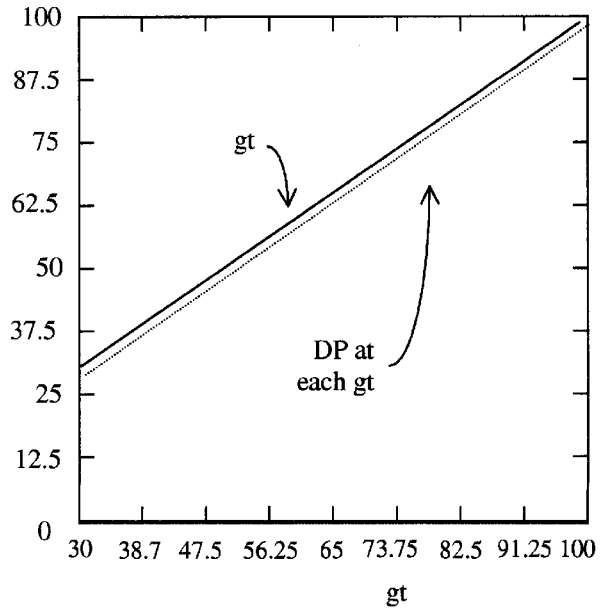

Fig. 3-a

Equilibrium Relative Humidity (ERH) : Chung Equation for Corn grain temperature, F to C 4-2 Constants: for yellow dent Corn A≡312.2 B≡16.958 C≡30.205

$G(gt)=(gt-32)\cdot \frac{5}{9}$   a-2 grain moisture (gm), wb to dry basis=md  $md(gm)=\frac{gm\cdot 100}{100-gm}$ 4-1 $ERH(gt)= \exp\left[\frac{-A}{(G(gt)+C)}\cdot \exp(md(gm)\cdot -B)\right]$ Saturation Pressures-PS from grain temperature=Ps(gt)

| | a-4 | a-5 | a-6 | a-7 |
|---|---|---|---|---|
| Ps constants | a≡0.61078 | b≡17.2693882 | c≡6.894757 | d≡237.31 | a-3 $Ps(gt)= \dfrac{a\cdot \exp\left[\dfrac{b\cdot G(gt)}{G(gt)+d}\right]}{c}$

Partial Pressures - Pv from ERH times Ps a-8 $Pv(gt)=Ps(gt)\cdot ERH(gt)$ a-9 $Pv_{si}(gt)=Pv(gt)\cdot c$ Dew point temperature of grain from Pv a-10 $Ac(gt)=\ln(Pv_{si}(gt))$ a-11 $DP(gt)=(6.983+14.38\cdot Ac(gt)+1.079\cdot Ac(gt)^2)\cdot \frac{9}{5}+32$ a-14 $gap(gt)=gt-DP(gt)$ a-15 $ERH(gt)=ERH(gt)\cdot 100$ a-12 gt=30, 35..100        a-13 gm=15.5

| a-16 gt | a-3 DP(gt) | a-4 gap(gt) | a-5 ERH(gt)% |
|---|---|---|---|
| 30 | 19.5 | 10.53 | 62 |
| 35 | 24.9 | 10.11 | 64.6 |
| 40 | 30.3 | 9.73 | 66.9 |
| 45 | 35.6 | 9.37 | 68.9 |
| 50 | 41 | 9.04 | 70.7 |
| 55 | 46.3 | 8.73 | 72.3 |
| 60 | 51.6 | 8.43 | 73.8 |
| 65 | 56.9 | 8.15 | 75.1 |
| 70 | 62.1 | 7.88 | 76.2 |
| 75 | 67.4 | 7.64 | 77.3 |
| 80 | 72.6 | 7.4 | 78.3 |
| 85 | 77.8 | 7.19 | 79.2 |
| 90 | 83 | 6.99 | 80 |
| 95 | 88.2 | 6.82 | 80.8 |
| 100 | 93.3 | 6.66 | 81.5 |

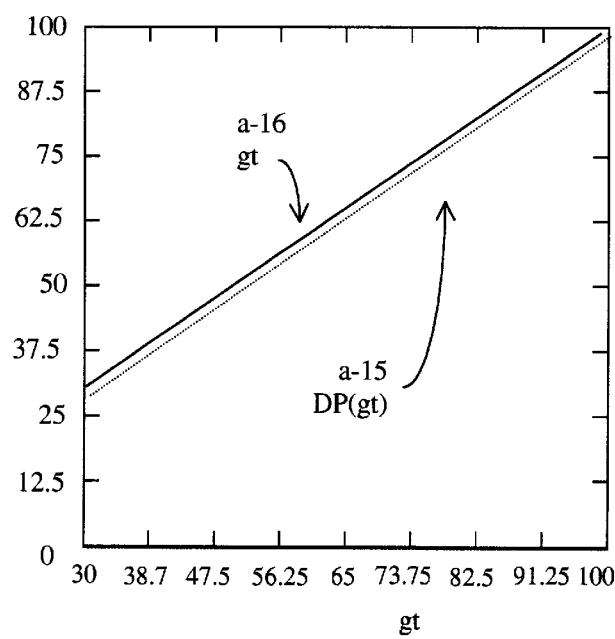

Fig. 4

1969 dry bulb and dew point temperatures used in experiment

Q5 gm≡22    Q6 cfm≡1    Q7 Bu≡10000    Q8 $Bu_{mass}$=56

Q-1 DB≡45    Q3 gt≡85    Q9 Pa≡14.6959    Q10 k=.62194    Q11 ca= .2405
Q-2 DP≡35    Q4 EDP≡83    Q12 a≡0.61078    Q13 b≡17.2693882    Q14 c≡6.894757
                                             Q15 d≡237.31 temperatures, F to C

Q16 $DP_c(DP)=(DP-32)\cdot\frac{5}{9}$ dew point    Q17 $EDP_c(EDP)=(EDP-32)\cdot\frac{5}{9}$ Partial Pressures - Pv Q18 $Pva(DP)=\dfrac{a\cdot\exp\left[\dfrac{b\cdot DP_c(DP)}{DP_c(DP)+d}\right]}{c}$    Q19 $Pvg(EDP)=\dfrac{a\cdot\exp\left[\dfrac{b\cdot EDP_c(EDP)}{EDP_c(EDP)+d}\right]}{c}$ a= air                                          g= grain Q20 $Aha(DP)=\dfrac{Pva(DP)\cdot k}{Pa-Pva(DP)}$    Absolute Humidity    Q21 $Ahg(EDP)=\dfrac{Pvg(EDP)\cdot k}{Pa-Pvg(EDP)}$ Q22 Absolute Temperature    $Ta(DB)=DB+459.69$    Q23 Specific Volume    $Va(DB)=\dfrac{53.35\cdot Ta(DB)}{144\cdot(Pa-Pva(DP))}$ Q24 M= Mass of Air    $MA=\dfrac{cfm\cdot Bu}{VA(DB)}\cdot 60$    WR= water removed - lbs/hr Q25 $WR(EDP)=(AHg(EDP)-Aha(DP))\cdot MA$ Heat Balance Calculation Mass of Grain                                   cg=specific heat of grain Q26 $MG=Bu\cdot Bu_{mass}$                     Q27 $cg(gm)=0.350+(0.00851\cdot gm)$ Q28 LH= latent heat of vaporization    $LH(gt)=1060.9+(.448(gt))$
Q29 DF= Difference between grain temperature and DB, in Farenheit    $DF=|gt-DB|$ Time for temperatures To equalize    Q30 $time=\dfrac{\overbrace{MG\cdot cg(gm)\cdot(DF)}^{Q\ of\ q\ 31}}{\underbrace{MA\cdot ca\cdot(DF)}_{Q\ A-32}+\underbrace{WR(EDP)\cdot LH(gt)}_{Qk\ 32}}$ $WR(gt)=1.032\cdot 10^3$    time= 8.04

Fig. 6

METHOD AND MEANS FOR GRAIN DRYING OPTIMIZATION

FIELD OF INVENTION

This invention relates in general to the treating of material with gas or vapor contact, and in particular, to the in-bin drying and conditioning of grain.

BACKGROUND

The Energy Costs of Drying

Due to uncertainty and lack of understanding, most operators continuously heat the grain and only use cooling to reduce spoilage risk when the grain is dry. The energy cost of this conventional practice is huge. It can exceed all the other grain production costs combined (except fertilizer). In 1978, 75% of a seven billion-bushel corn crop required nearly 875 million gallons of LP gas for drying. Today's corn crops exceed 9 billion bushels and require 90% artificial drying. In addition, millions of dollars are lost each year because of grain being cracked from poorly controlled drying.

PROBLEMS IN THE PRIOR ART

The basic approach to drying has remained essentially the same since the 1840's: blowing heated air through the grain followed by ventilation just for cooling. It has been assumed that heating the grain was the only method for accelerating drying. In those instances where researchers did cool their grain to aid drying, they only did so as a one-time procedure.

Relative humidity (RH) and its companions—Equilibrium Moisture Content (EMC) and Equilibrium Relative Humidity (ERH)—have remained the principal control variables. On occasion grain moisture sampling is used for direct feedback. On the surface, these concepts appear quite reasonable; however, our drying research has uncovered the following:
1) Relative Humidity, as a control in itself, is fundamentally flawed.
2) Grain Moisture feedback, as commonly used, is also flawed.
3) The use of constant heat does not produce drying optimization.
4) The standard methods for solar heating are often counterproductive.
5) The 'wet warming' of grain during warm fronts followed by the planned use of cooling during the nights of cold fronts, is much more efficient than continuos heating.

OBJECTIVES

It is the objective of this art to advance methods for drying materials in general, and grain in particular, with greater certainty, control, quality, and economy.
The Theory, Methods, and Means to do so:

The basic problem of the prior art is an inadequate expression of the nature of drying.

It was known since the 1930's and proven in 1940 that the driving force for drying is differences in vapor pressure. However, the early researchers directly measured grain moisture and indirectly described these vapor pressure differences in terms of relative humidity (RH) and equilibrium limits. At first this was due to the lack of the needed sensors. However, even when the sensors did become available, the use of comparative measures continued. Without the ability to quantify relationships, optimization is not obtainable.

Theory of Differential Vapor Pressure (dPv):

This instant art advances a method of indirectly measuring the material and directly analyzing dPv's. As I will show, this allows integration of temperature and moisture relationships and provides a method for quantifying the changes. Out of this emerges a better understanding of the needed sensing and sensor placement, data formatting, and the subsequent opportunities for optimization.

Direct computation of differential vapor pressure opens a new method of analyzing drying changes. While these concepts are not obvious and intuitive at the start, the underlying dynamics are simple extensions of classic concepts. With such analysis, the present art can open a whole new paradigm of drying.

Logic.

The key to understanding drying and sensor placement is to understand the role of pressure in drying, particularly that of vapor pressure.
A: Pressure is the only manipulable force for moving fluids.
B: Water, water vapor, and air are fluids, (fluid—Greek, to flow).
C: Drying only occurs if the pressure for the vapor to leave the material is greater than for it to re-enter or remain.
D: The Ideal Gas law is the foundation for understanding Pressure.

In *Drying and Storage of Grains and Oilseeds*, Donald B. Brooker, Fred W. Bakker-Arkema, C. W. Hall, published by Van Nostrand Reinhold, New York, (633.1046/b791ds), write "Under the conditions at which grain drying takes place, the Ideal Gas Law expresses accurately the relationship between the pressure, temperature, and volume for the dry air and associated water vapor".

The Ideal Gas Law is traditionally written as: $PV=nRT$.
P=pressure; V=volume; n=moles; R=gas constant; and T=temperature.

With M=mass of moisture replacing the chemical term n=moles, we can rewrite the traditional expression in terms of pressure:

$$P=M/V*T*R,$$

If we set V=1 cu ft and regard it as a constant we can omit the V term. Likewise, R being a constant, we can for convenience, omit it also.

Results: $P\sim M*T$: Pressure is proportional to a product of Mass (of the moisture) and Temperature (of the moisture).

Proportional=~, for sake of writing with this word processor.

To express vapor pressure differences mathematically requires two opposing pressure equations.

$$P(\text{material})-P(\text{air})$$

Omitting the P term on each side of two pressure equations and substituting the mass and temperature variables for air (a) and grain (g) in this instance leaves the following:
Basic Model:

$$dPv=[(Mg*Tg)-(Ma*Ta)]$$

with M=actual moisture per unit volume and T=temperature.

Key: Each vapor pressure difference is dependent on two opposing multivariate expressions. Four values are needed to precisely define each relationship.

Inductive conclusions of the symbolic model.
1) Looking at the symbolic model, $(Mg*Tg)-(Ma*Ta)$, it is possible to see that constant or continual heating will not produce optimization. When the temperatures have reached equilibrium, the only remaining driving force is the differences in moisture concentrations. While this could be large, it can not be as large as a 'lowered' ambient temperature or moisture or both. When the grain and air temperatures have reached equilibrium, the use of naturally cold or chilled air will be more efficient than constant heat.

2) In addition, it is possible to see why drying can be facilitated by the deliberate ventilation of warmer grain with colder, drier air. When air is selected (or conditioned) for low ambient temperature and moisture, its ambient vapor pressure is low. Since drying is driven by difference, this 'lowering' of the outside vapor pressure increases the drying potential. Also, the effect of the lower moisture can be dramatic. A two-degree drop in incoming dew point can have the same effect as a twenty-degree rise in grain temperature. Moreover, this increased potential for drying comes minus the cost of expensive fossil fuels and the penalty of the added vapor from the combustion of those fossil gases.

Hidden bias: The Grain as just an Object.

In the past, an almost unconscious attitude developed that grain is just an object to be treated and that all the drying heat comes form the air. It's our finding that having the grain 'participate' in the drying not only can lead to greater efficiency, but also higher quality. This participation is in two forms.

First, because grain has an inherently higher specific heat than air, it can act as a solar collector and heat storage means. Instead of having to build solar collectors and thermal storage means external to the bin, we simply 'store' heat from warm fronts (or auxiliary heating) in the grain. Conventional use of solar heating can actually be counterproductive. When the air is heated before entering the bin, it can be made 'too' dry. The heated air can be so low in moisture that it overdryes the bottom layers and then transports that moisture to the upper layers leaving them too wet.

Second, when outside air is colder and dryer that the grain, running the fans makes the grain the 'heater' of that air. This cold, dry air already has a naturally low vapor pressure. However, as the incoming cold air is heated, it expands. This expansion makes this air relatively even dryer. Also, when the grain is the source of heat for the incoming air, it is providing both the heat for the sensible change and for the latent heat for evaporation. The effect can be a three-fold increase in efficiency for a bin, a 16-fold increase for a layer.

In addition, the air is never heated above the grain's temperature or made 'wetter' than the grain's moisture. Therefore, as this air then exits, all the moisture that evaporated remains in the exiting air and does not re-condense in the upper grain layers. In reverse, if cold grain were being intensely heated, the grain at the bottom would dry, but as the hot, moist air rose through the cold upper layers, much of it could re-condense and have to be re-evaporated, maybe several time over.

BRIEF SUMMARY

When the earlier researchers began studying drying they did not have access to remote monitoring and microprocessing. However, they did have access to absorptive RH sensors. Because of this, they focused on RH and made assumptions to ease calculations. When RH is the focus, the means for effecting drying center on heat or selecting air with certain RH levels. Cooling the grain would be something done only when the drying was complete. When cooling was used for drying, the focus was a one time cooling of grain emptied from hi-temp dryers.

A differential vapor pressure model in combination with current technology changes this thinking. The technology enables remote sensing and the model directs the data be sensed as, or converted to, pairs of independent temperatures and moistures, preferably as Dry Bulb (DB) and Dew Point (DP) values. The newly developed, rugged, and cost efficient RH sensors can be used, however their values would be used together with their paired temperatures to calculate dew point values. Even without quantification, the simple plotting of DB and DP values changing over time presents an intuitive view of drying progress (see FIGS. 1-a and 1-d). However, the model aids in forecasting and adaptive control, means.

Indirect Material Measurement.

In the technical appendix I list in detail the factors of genetic varieties, physical and chemical variations, different growth histories, and harvest needs which can affect the grain's drying rates. The prior art is very limited in dealing with this diversity (see appendix of prior art for the critiques in detail). However, by incorporating the older concepts of equilibrium with paired sensing as Dry Bulb (DB) and Dew Point (DP) values, we can effect a new approach of data analysis. We operationally effect a functional integration of the grain's variations as independent values comparable to all the other data points. Weather can be sensed or converted to a series of incoming Dry Bulb and Dew Points. Thus different vertical and horizontal grid points within the bin, the air inlet/outlet values and distant incoming weather patterns can all be formed into a common data format.

With a common data format and bin data (mass of grain, airflow, etc.), an algorithm can be developed to quantify the pounds of water removed (WR) between any two points. With quantified values, incoming weather potentials can be evaluated with regard to the grain for start up times. Once running, a comparison of the inlet and exit values helps determine optimum times for stopping the fans. By being able to progressively monitor both the internal changes during drying and the incoming weather, adaptive feedback control is possible.

In addition, by being able to quantify the amount of water being removed, the enthalpy of the latent heat (QL) can be calculated. With QL, a Heat Balance calculation is now possible. With a Heat Balance, the time to temperature equilibrium (Te) is derivable. With WR as a measure of mass exchange potential and Te as a time calculation, we can begin evaluating the incoming weather in terms needed fan times and costs. Once the awareness of the potential savings from optimization can be made visible to the bottom line, the adoption of these techniques will soar.

DRAWINGS

Because this research has now taken place for over twenty years, I am not able to distill all of these findings in just a few brief introductory pages. However, with the use of the following figures and more discussion, the essential novelties of this art will be self-apparent.

List of Figures.

FIG. 1 is experimental data showing the flaw of RH and the increased drying from cold air.

FIG. 1-a is a graph of grain being cooled.

FIG. 1-b is a graph of the classical vapor pressure changes as temperature is increased.

FIG. 1-c is the same graph except with the temperature as decreasing.

FIG. 1-d is a graph of the changing drying relationships plotted as temperatures and dew points.

FIG. 3 is a graph of the Henderson equation as temperature and equilibrium dew points (EDP's) for 15.5% corn.

FIG. 3-a is the same FIG. 3 except the grain moisture is 21.5%, wet basis

FIG. 4 is the same plot but with the Chung ERH equation for 15.5% corn.

Figure 5:
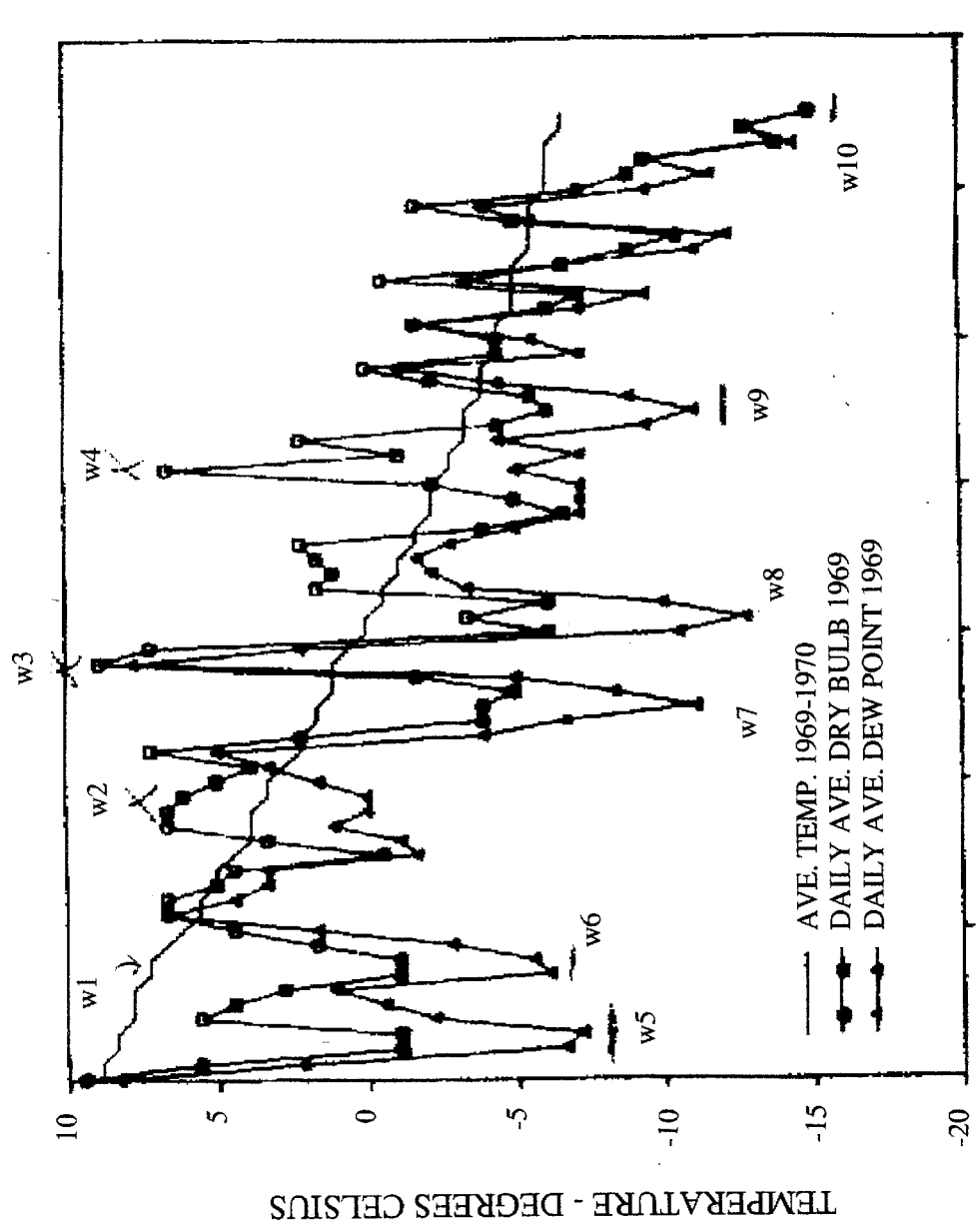

FIG. 5 is a graph of changes in the weather plotted in terms of dry bulbs and dew points.

FIG. 6-a is the algorithm for integrating temperatures and dew points to the amount of water removed (WR).

FIG. 6-b is a heat balance for cooling.

Figure 7:
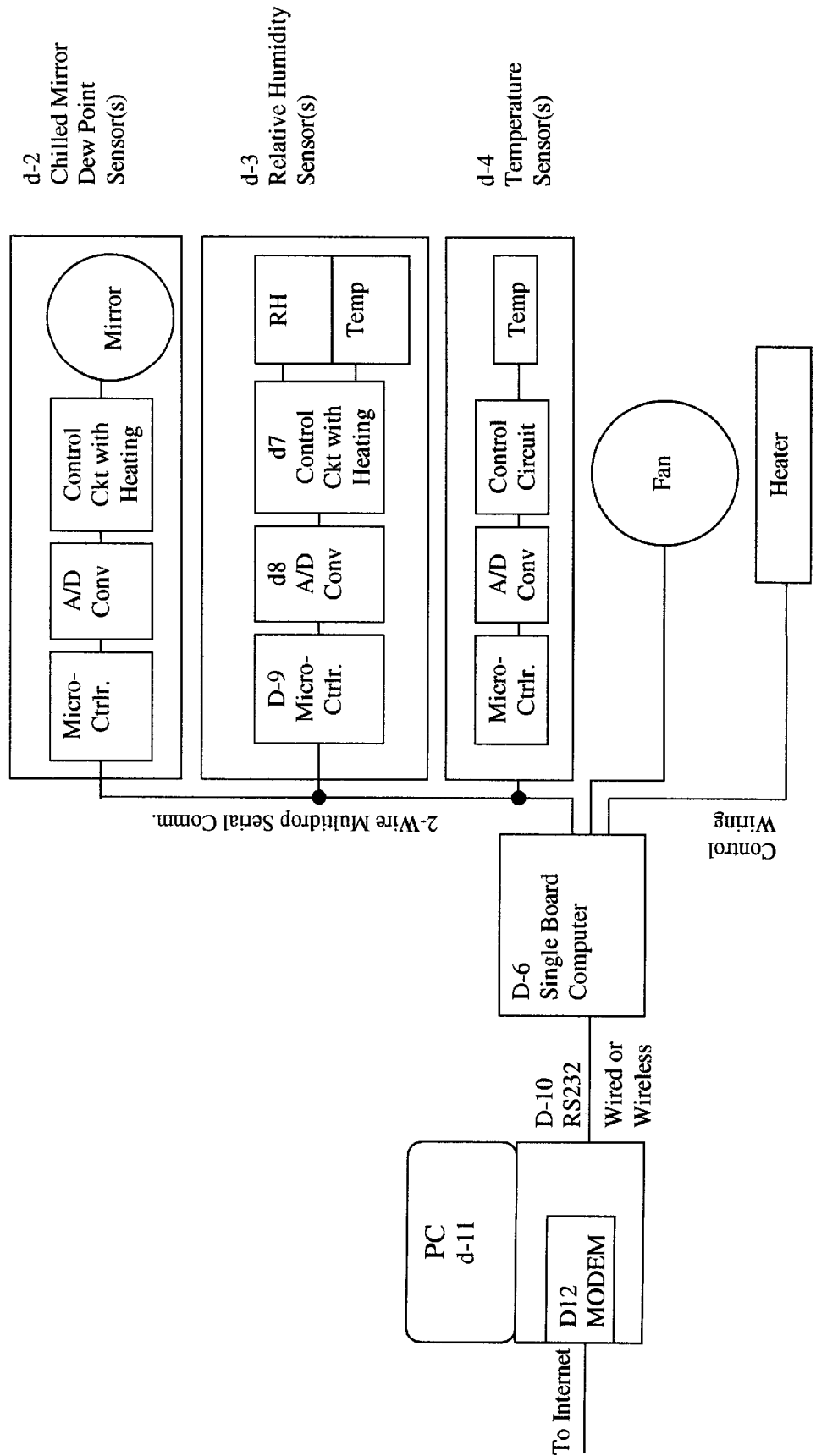

FIG. 7 is the drying control schematic.

Figure 8:
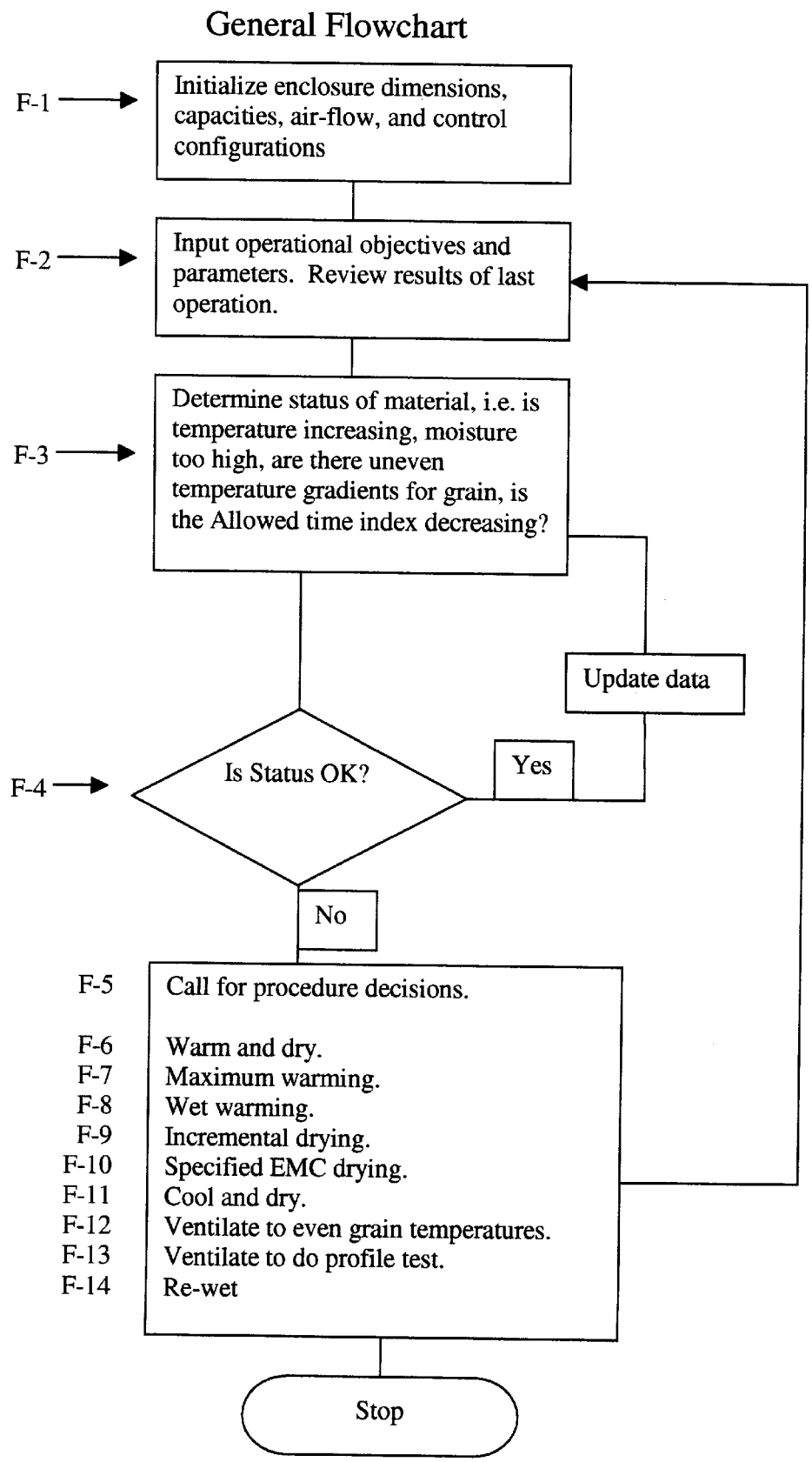

FIG. 8 is a general flowchart for overall operations.

DETAILED DESCRIPTION OF THE GRAPHS

FIG. 1 is a data sheet that with study demonstrates several of our findings. The logic of a differential vapor pressure model predicts that drying can be increased with cooling. That this is the case is seen by contrasting data set A and B. Further, it can be seen by comparing data set C with D and then E with F that drying can increase as relative humidity increases. This is contrary to conventional wisdom but can be understood in terms of dPv logic.

RH is a ratio. Its value can increase without any chance in the absolute humidity just because the ambient temperature is decreasing. Further, as the ambient temperature decreases, it decreases the incoming vapor pressure even more. This then leads to a greater differential between the incoming air and the grain and thus more drying.

FIG. 1-a is the result of a chance bin monitoring in 1982. It is this graph that began the awareness that RH was not the best way to monitor drying. When the data was plotted as changes in temperature and RH, the pattern was unclear. However, when I plotted the changes with dew point or the actual humidity values, a much clearer image emerged. (See personal and technical background papers for more detail). Further, when I solved for the amount of water removed per hour (WR), the changes were profound. At 7 p.m. the WR was 530, at 9 p.m. 30, With subsequent testing I now believe these changes occurred within first 15–30 minutes instead of the two hours. The two-hour gap is instructive in itself. After I started the fan at seven I didn't go back out until nine because, according to equilibrium thinking, the drying was supposed to stabilize first. (It is my theory again that because the early researchers did not have ready access to remote sensing, they ignored it. They did have absorptive RH sensors and could conduct the equilibrium studies. However, the focus on equilibrium predisposed the early researchers to ignore the temperature and moisture fluctuations before equilibrium as inconsequential or sources of experimental error.)

FIG. 1-b is a classic plot of the changes in vapor pressure in equilibrium with an unlimited amount of water as temperature is increased incrementally. It is a key to understanding the fundamental physics of drying. As the temperature increases, more molecules in the liquid reach the escape velocity and overcome its surface tension. However, with increasing temperatures and more freed molecules, the combined affect is an exponential increase in vapor pressure (Pv). This continues until the vapor pressure equals the atmospheric pressure and the liquid begins to boil. This increase in vapor pressure has been the root of success of the prior art. Cook the grain hard enough and long enough and the internal moisture can be driven out. However, at a huge price in energy and quality. The key point, however is that the changes in temperature can be linear but produce non-linear changes in Pv.

FIG. 1-c is just this classical curve reversed. This is a plot with the temperature decreasing. The point to note is that the shape of the curve is similar to the plot of dew point changes in FIG. 1-a. This is further demonstration that cooling can produce rapid, non-linear changes in moisture. With thought, this curve can shed light on the concept of 'grid awareness'. Care must be taken when measuring non-linear phenomenon. I lost important data in the 1-a study because the time 'grid' or rate of sampling missed the early rapid changes. Important extensions of this seen in those systems that just measure inlet and outlet values. Inlet and outlet are needed and this lack is one on the major deficiencies in the prior art. However, in systems such as the Hi-temp dryers that assume linear change and just measure the inlet and outlet grain moistures, they miss important data. This is expressed as the line y-x from point In to point Out. The area between the non-linear curve and the straight line represents the amount of heat energy currently wasted and wasting the quality of the grain.

FIG. 1-d is an example of a visual representation of drying that is intuitively understandable. Once the values have been sensed or converted to dry bulb and dew point data streams, the changing relationships can be easily visualized. In the graph line 1 is the profile of the input ambient temperature. Line 2 is the input dew point. Line three is the resultant exhaust dew point. The difference between line 2 and line 3 is the amount of water removed. The thing to note is that with the plotting of data as Dry Bulb and Dew Point, it is easy to see the drying relationships. In this case it is easy to see that the drying at midnight is much greater than that at three in the afternoon.

Figure 2A:
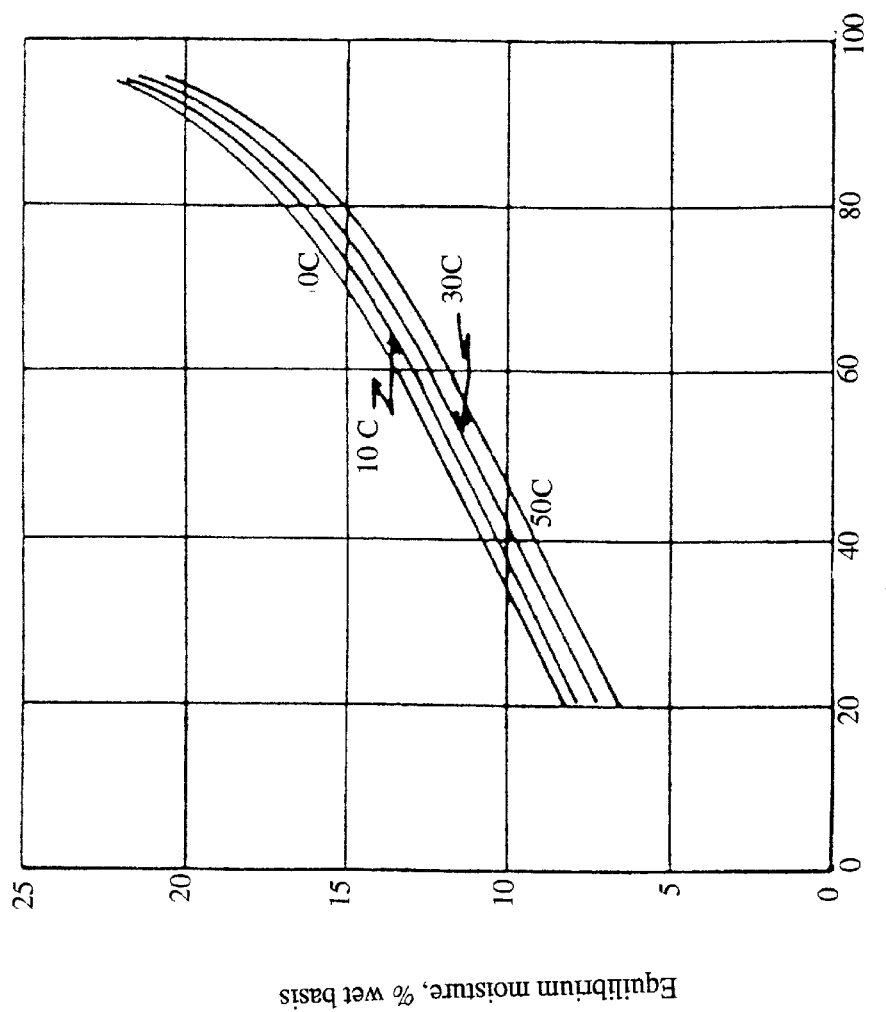
FIG. 2 is typical graphs of equilibrium functions plotted against Relative Humidity.
Figure 2B:
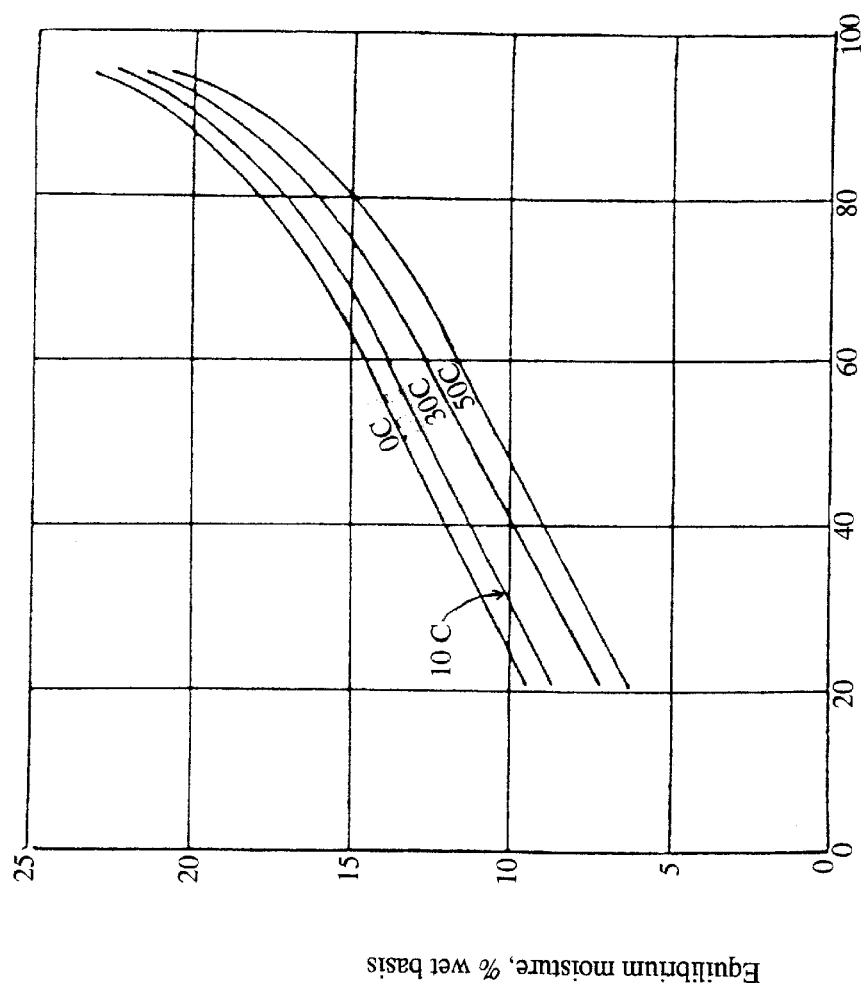
Figure 2C:
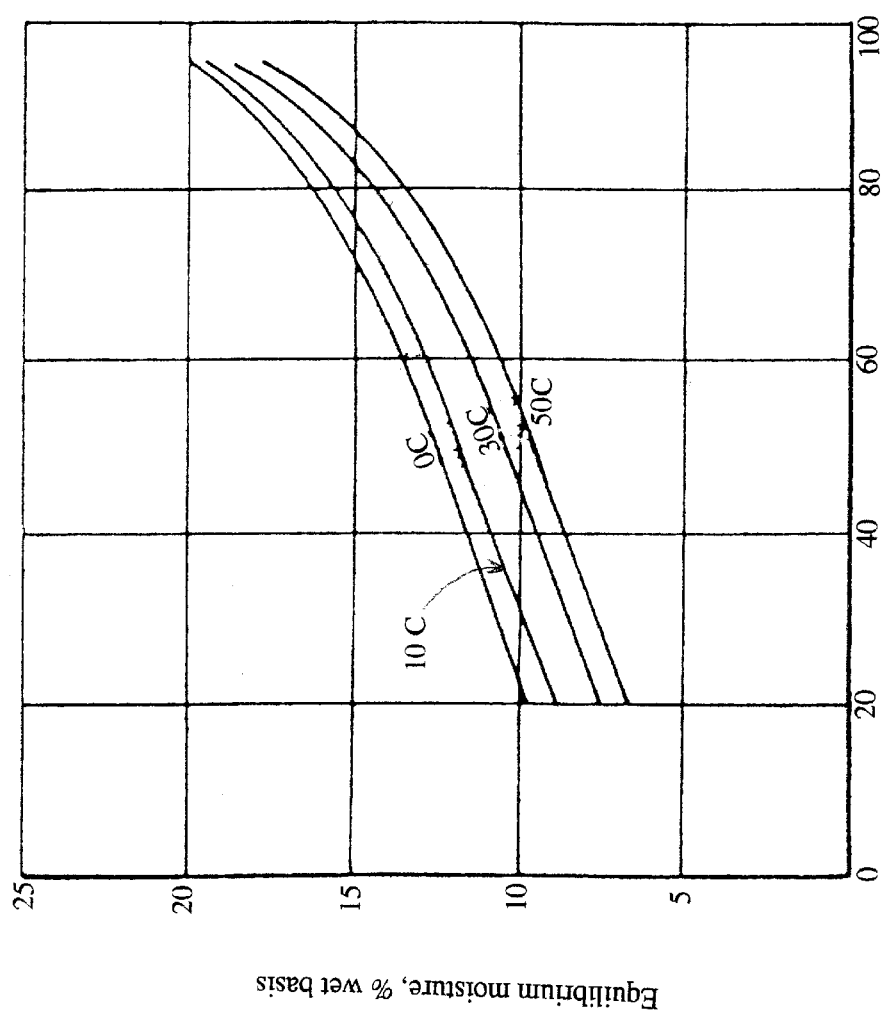

FIG. 2 is a data sheet giving formulas for equilibrium (EMC) and equilibrium relative humidity (ERH) and showing a series of graphs depicting EMC's curves. Large quantities of equilibrium data have been experimentally collected over six decades. However, with the conventional means of display, the curves are non-linear and therefore hard to read and harder to use. Also, these results are from lab studies. However good the work and the accuracy of the testing, the studied samples are representative at best. Even if the grain being dried were the exact variety tested in the lab and this is a very big if, the growing history, harvest, and handling could all vary. Any one of these factors could alter the profiles.

FIGS. 3, 3-a, and 4 show the results of converting these RH curves to dry bulb and dew point values.

One of the tests of a new theory is how it treats the data of the prior theories. Over the years a large body of data accumulated relating grain moisture to RH. Researchers would establish equilibrium conditions for grain samples at different moistures and plot the relative humidity readings as seen in FIG. 2. The nonlinear shapes and the number of the curves to represent different temperatures, however, make them hard to use in the field. In our approach, we map grain moistures to both the dry bulb and dew point readings. The outcome is the simplified data expressions seen in FIGS. 3 through 4.

A very important aspect of our art is that now we can use this equilibrium approach in the field. Because our preferred embodiment utilizes intelligent sensing and microprocessing, we can track the changes within the bin as changes in temperature and moisture values measured over time. This is the feature I am calling 'functional profiling'. Not only do the internal sensors monitor the grain's condition, they now can time the periods to reach equilibrium. This ability enables the grain to 'integrate' its variables operationally. The almost infinite mix of grain conditions can now be simply expressed as vapor pressure maps of dry bulbs and dew points over the course the of drying operations. Setting the expressions for target moistures gives a clearer picture of the desired relationships and interpreting the current data 'backwards' gives a grain moisture reading. (Backwards would be using the values to generate an RH reading, then with the temperature generating the predicted moisture at that equilibrium—the EMC.)

The Math.

Differential vapor pressure thinking focuses attention on using input data that are 'psychometrically' independent. Because of our desire to have a common data environment, it occurred to me that I could develop a conversion algorithm that would utilize the equilibrium equations but express these relationships in term of temperature and dew point. In this case dry bulb and dew point are used because they are independent, easily incorporated in the quantitative algorithm, and are the field input sense mode of choice.

FIGS. 3, 3-*a*, and 4 are descriptions of the mathematical steps to do so and the resulting graphs.

In this instance a commercial package called Mathcad 5 by MathSoft was used to compute and plot the values. The particular means however, could be other software. The important point is that the conventional equilibrium calculations can be converted to these linear results shown in FIGS. 3, 3-*a*, and 4 by using classical psychrometric functions and our concept of mapping these changes. In each case the algorithm is the same with the only differences being the particular equilibrium equation, its constants, and different grain moistures.

By utilizing the equilibrium relative humidity (ERH) relationships 3-1, 3-1*a* and 4-1, a range of grain temperatures, (a-12), and grain moistures, (a-13), plots can be developed that transform ERH relationships into 'equilibrium dew point' (EDP) graphs for the grain (a-15). In this case the psychrometric functions are those of Albert Weiss, "Calculation of Moist Air Properties on a Hand Calculator", Transactions ASAE, March 1977, p1133–1136.

For equilibrium equations, the input data is usually needed in degrees centigrade and the grain moisture calculated on per cent dry basis. This conversion is done in a-1 and a-2. The individual ERH equations (3-1. 3-1*a*, and 4-1) utilize this modified data to generate a decimal ERH. Equation a-3 then uses the grain temperature as input and returns the saturated vapor pressure (Ps or a-3) for that temperature. The values a-4, a-5, a-6 and a-7 are the constants for the Ps equation. The Ps or a-3 value is then multiplied by the ERH value to give the partial vapor pressure (Pv or a-8). Equations a-9, a-10, and a-11 convert the Pv into the dew point temperature.

We could just as easily use the Absolute Humidity values, but they are small numbers containing decimal points. Comparing DB and DP is more intuitive. The numbers are most often only two digits and because they are independent values, they can be directly compared. Their plots afford a more direct, intuitive understanding of the differences in actual moisture level differences. This has great utility in the field because the plots are simple and patterns are easy to see (see FIG. 1-*d*).

Equation a-14 represents the 'gap' or the difference in degrees between the grain temperature and the grain's dew point. FIG. 3-*a* is the same as FIG. 3 or 4 except it is a graph with the grain moisture set at 21.5%, wet basis. The important point here is that the different moistures just have different 'gaps'. This is true of other commodities also. Although not shown, the differences between the gaps for rice and corn are also just different offsets and slopes.

The use of these routines is beneficial in several ways. The main value is that it allows for the creation of a common data format. With both the air and grain values expressed in independent temperature and moisture values, direct comparisons can be made intuitively and in software. This increases the ease with which an operator can select the desired relationships of temperatures and moistures for optimization. For example if the grain's dew point is 40 and the air's is 60, the grain could re-wet versus drying. These relationships are not immediately apparent from looking at a plot of ERH data. However, when the data is transformed into a common data format, calculation and selection of ambient goals becomes much easier. Another of the benefits of this conversion algorithm is data forecasting. Besides being able to use the ERH conversions to establish a common data environment, they are useful for forecasting the desired range of ambient values for processing.

Yet another benefit is that the linear data can be 'bin' adjusted. Grain can differ in equilibrium values by variety and condition. Because of this, a standard plot might not be accurate for an individual bin. Also, whatever the 'gap', market value is determined by the receiving elevator's moisture meter readings. Linearity, however, facilitates 'adjusting' the gap for any individual bin. Simple and specific offsets can be created in software by comparing the sensor's estimates of moistures with those of the elevator's grain moisture meter. This allows for easy field adjustment. I know of no other system controllers that can be similarly adjusted.

Yet another benefit is that temperature and moisture readings taken within the grain bin can be compared to different 'gap' readings and the grain moisture estimated (that it is also possible to use the equilibrium equations 'backward' has already been discussed). This ability to estimate the moistures of non-flowing grain at several points within a bin, as far as I know, is novel to this art.

Finally, these graphs confirm the role of vapor pressure in drying. Note as the grain temperature increases so does the EDP's. The EDP's represent the equilibrium dew points and Dew Points map directly to vapor pressures. This has been the source of success of heating grain in the past. Heating grain intensely enough forces the internal vapor pressure to exceed that of the ambient air at some point. However, at huge costs in fuel and quality of the grain.

In addition, these concepts could be extended to mapping the responses of different volatile compounds (VOC's ). This will be discussed in the section on VOC's in the extended application section.

Weather Diagnosis—Wx.

One of the most novel findings of this art is to realize the value of the cyclic use of warm and cold air for drying. FIG. 5 shows that weather data can be transformed into an extended series of temperature and moisture changes. The benefit is that now incoming weather is a part of the common data format and can be quantitatively incorporated in drying calculations. This allows true adaptive feedback routines that can smooth process fluctuations. Another important point is that the value of the air to dry is not dependent solely on its "average temperature".

Referring to the weather exhibit, FIG. 5. For sure, the average temperature w-1 declines over the 71 days past Oct., however this does not mean than all the drying potential follows at an equal rate. The ability to warm grain on the incoming warm fronts (w-2, w-3, and w-4) lessens but is not eliminated until quite late in the fall. However the ability to cool (w-5, w-6, w-7, w-8, w-9, and w-10) continues. The incoming dew point temperatures (seen at w-5, w-6, w-7, w-8, and w-9) can have pronounced dips. This cold, dry air creates a drying medium with naturally low vapor pressure. It is exactly this combination of cold and dry air being blown through warmer grain that can produce marked increases in drying efficiency.

Symbols to numbers—The Differential Vapor Pressure Algorithm:

FIGS. 6, 6-a, and 6-b are listings of the algorithm for the quantification of differential vapor pressure (dPv) differences.

Integration of the Ideal Gas Law and Psychrometrics produced the symbolic model. Psychrometrics combined with the equilibrium equations produced algorithms for a common data environment. Weather plotted as independent temperature and moisture values extended that data environment. Now, with a common data environment and quantification of the symbolic model, direct calculation of vapor pressure differentials is possible.

Psychrometrics is a set of equations for defining the properties of moist air. In a general sense it is a moist Ideal Gas Law expressed in numbers. The important point is that it is an established study of thermodynamics that can be used to quantify the symbolic model.

Input for the Quantitative Model—Direct Conversion of Air Values into pounds of Water Removed (WR).

The first section of the model is the simultaneous input of two independent temperature and moisture pairs (q-1 and q2, q-3 and q-4). In this case the values are pairs of dry bulb and dew point temperatures. They could equally be any other combination of psychrometric values that would reduce to dry bulb and dew points. The conversion equations are readily available in textbooks and literature and not in themselves novel.

It is the thesis of this model that all four values should be progressively calculated in time for each differential being plotted. Psychrometric relationships are 'web' like in the same way as those of the Ideal Gas Law. Each change in temperature or moisture can change other values. In addition, the changes are not simple or linear. Also the changes that track with temperature do not change at the same rate as those that rack with moisture. For data to be viewed as data streams, the changes need to be sensed, calculated, and plotted progressively.

In particular, with each temperature change of the incoming air, the value for specific volume changes. This in turn alters the calculation for the mass of air entering the plenum during the sampling interval. If the air mass is off, then so would WR, pounds of water removed per time unit. This also represents one of the major novelties compared to the prior art. In the past, if calculations were even made, they were made with many more assumptions, at fewer sites, and less frequently.

Each input point needs a 'pair' of values.

A temperature or moisture by itself is only comparative. However, with a temperature and moisture pair, a computer, and the psychrometric functions in software, some twenty equations can be generated.

Each vapor pressure comparison needs a 'pair of points'

By definition a differential value requires at least two points of comparison, a 'pair of points'. In theory, only two such 'pairs' would be required to detect the input and output change for a whole bin. In practice, however, much richer control options develop as the number of 'pair-points' is expanded. This is particularly true for expanding the precision of maximum heating and controlled rates of drying. This will be seen with greater clarity in the coming discussions of the new control options that become available because of this instant art.

The Vapor Pressure Curve—the Source of Complication for Drying.

As explained in FIG. 1-b, the vapor pressure curve is non-linear. As temperature increments linearly, it affects Pv changes non-linearly but differently depending on the particular temperature range. This is the source of frustration when trying to use just temperature change to gauge drying. We address this by using the 'higher order' relationship of dPv that integrates core changes (pairs of points as pairs of temperatures and moistures). The preferred embodiment puts these calculations in software and automates the input. However, the values could be gained manually and calculated with a math calculator that had the natural log and exponential functions.

In the preferred embodiment, the algorithm starts with gathering by sensing, calculation, or estimation input data as, or convertible to, dry bulbs and dew points. The agorthim is mostly insensitive to the various sensing means as long as the data can be converted to independent temperatures and moistures.

In this particular figure the vapor pressure curve is for water vapor. It has been derived in equilibrium with an unlimited amount of water as compared to the mass of water vapor, i.e. the vapor above the liquid attains saturation for each temperature increase. Again, the math for this curve comes form Albert Weiss, "Calculation of Moist Air Properties on a Hand Calculator", Transactions ASAE, March 1977, p1133–1136. I like the curve because it is easier to use in a spreadsheet and is as accurate or more so than Brooker's work in the 1970's. However, other curves could be developed and still remain with in the spirit of this art. For example, the vapor pressure curve could be for ammonia in livestock buildings or volatile organic compounds (VOC's) in homes or offices. Different sensors and gas constants would be needed but the principles are parallel.

As the model is being set up, the data for the subsequent heat balance equation is entered at the same time. q-5 is a grain moisture reading expressed in % wet basis. It will be used later to estimate the grain's specific heat, q-27. The airflow is entered as cubic feet per minute per bushel, here shorten to cfm (q-6). The bushels of grain are noted with Bu (q-7). The bushel mass is q-8. In this case it is set for corn but could be other grains or materials as well. Pa (q-9) is the atmospheric pressure, here set for sea level. The ratio of gas constants for air and water vapor (k or (q-10)) is used in the functions to calculate the absolute humidities and ca or q11 is the specific heat of air. Constants q-12, q-13, q-14, and q-15 are used in the vapor pressure curves.

After the data is entered, the dew point values q-2 and q-4 are converted to degrees centigrade (q-16 and q-17) to be input for the vapor pressure equations (q-18 and q-19). The vapor pressures are then used as input to compute the absolute humidities q-20 and q-21. AHg is used to designate, in this case, the absolute humidity of the air in equilibrium with the grain being sampled. AHa is used to designate the actual humidity of the ambient air. The difference in the AHg–AHa calculation indicates the direction of the mass exchange. However, before this FIG. can be converted into the actual amount of water removed (WR or q-25), this value needs to be incorporated with the Mass of airflow (MA or q-24). To do this requires that the specific volume (q-23) be calculated and this requires the computation of the absolute temperature (q-22). Most all of these adjustments are ignored in the prior art.

The principal benefit of this calculation is the WR output. It gives the value of prime interest. It integrates the continually varying air and grain values into a simple measure of performance. In the prior art, vapor pressure differences, if measured, were only measured partially and I or indirectly. This resulted in diverse data that was only comparative at best. With the WR value the drying potential can be forecast before the fans are started. Once the drying has started, WR is a direct feedback of drying performance. In those instances such as rice drying that need precisely controlled rates of drying, WR is the only control variable I know that allows a closely regulated rate of moisture removal.

In addition, a second very valuable contribution of this algorithm is in its enabling the calculation of the time to reach equilibrium (Teq) or Q-30. In conventional thinking, arbitrary times are chosen for aeration. As if declaring a time interval will bring the air and grain in harmony of it self. However, as seen in the Heat and Mass balance equation for time, time is a dependent variable.

Our research indicates that the time to equilibrium can be an important tool for process planning and control. If the (Q-24), the air's specific heat (Q-11), and the temperature differential (Q-29). However, as seen in the air mass equation (Q-24), this value needs the input of the air's specific volume (SV). SV in turn requires a calculation of the air's absolute temperature. Again, these calculations do not appear often in the prior art.

The latent heat (Q-33) is the enthalpy that integrates the amount of water evaporated (WR or Q-25) and the latent heat of vaporization, (LH or q-28). The LH is the amount of BTU's to evaporate a pound of water. It also changes with temperature. Without the insight generated from our model, the prior art does not gather the input to compute WR nor the changing values of LH (Q-28). Without these values, the latent heat can only be estimated. However, as will be seen next, the amount of latent heat and its source have a profound effect on drying efficiency.

Denominator Shifts Between Heating and Cooling:

When the grain is the source of heat for the incoming air, it is providing both the heat for the sensible change and the latent heat for evaporation. In this case the Latent Heat is 'below' or in the Heat Balance denominator. The time to temperature equilibrium for cooling is:

Cooling:

$$\text{Time to Teq} = \frac{[\text{Grain Mass} \times \text{Specific Heat(g)} \times \text{Temp. Difference.}]}{[\text{Air Mass} \times (\text{Specific Heat(a)} \times \text{Temp. Diff.}] + [(\text{WR} \times \text{LH})]}$$

grain in being heated incrementally, heat transfer efficiency falls off as temperature equilibrium is approached. Also, the rates of cooling can be sharply affected by the temperature differentials. In addition, there can be large differences between the times for heating and cooling. It had taken 50 hours to heat a two-foot layer of 30% corn. With a cold front, I dried three-fourths of the grain in one-half hour yet it was two to three hours before the last six inches reached equilibrium.

To calculate the time to equilibrium requires three different enthalpy or heat values. Q-31 is the enthalpy of the grain. This value integrates the mass of grain being dried (Q-26), it's specific heat (Q-27), and the temperature differential (Q-29) between the air and grain across the interval being compared. Here again the novelty of our art shows through. Because we gather internal data with both a temperature and moisture, we can use the conversion routines and equilibrium equations of our FIGS. 3 and 4 to generate a grain moisture reading form our inputs of dry bulb and dew points. In the first case we can take temperature and grain moisture readings from commercial grain moisture meters and convert the data to our common data format. In this case we can reverse the process and gather on going grain moistures to within the bin. Grain moisture readings in the prior art require flowing grain; our system allows readings within the bin.

The second needed enthalpy is that of the sensible heat or Q-32. The sensible heat is an integration of the air mass The time equation for heating, however, is different. When the air is the heat source, the Latent heat for evaporation comes form the air. This puts the enthalpy of the latent heat changes 'above' the line. Time to temperature equilibrium for heating is:

Heating:

$$\text{Time to Teq} = \frac{[\text{Grain Mass} \times \text{Specific Heat(g)} \times \text{Temp. Diff.}] + [(\text{WR} \times \text{LH})]}{[\text{Air Mass} \times (\text{Specific Heat(a)} \times \text{Temp. Difference.}]}$$

Several distinct points emerge from knowledge of these equations. One, the use of fixed periods of time to effect control automatically indicates that a design is not one focused on true optimization. These 'predetermined times of running' in the prior art usually mean values determined in a lab or set for 'average conditions'. They may be momentarily economically justified, however full efficiency is being sacrificed for expedience. We determine the air-grain relationships and allow the processes to continue as long as productive, driven by the inherent dynamics and not some pre-conceived time interval (this idea can be extended to defrosting cycles and other uses of fixed times in air conditioning).

Second, experience with drying operations shows that the time responses can be very non-linear. One of the reasons for this is Newton's law of cooling. The essence of the law is that the rate of change is proportional to initial differences. The greater the difference at the start the faster the rate of change. It's the finding of this art that a similar, but greater effect occurs with moisture differences. What it means in the field is that efficiencies of drying can be very much influenced by the selection or conditions of running. In one case the difference between one day and the following was the difference of 460 lbs of water removed per hour vs. an estimated six lb. per hour.

In another trail, the fans had been run continuously for a solid week in the first week of October. The bin was subsequently outfitted with sensors and monitored until Thanksgiving. As Thanksgiving approached, an arctic front came in with temperatures in the 20's and dew points in the teens. Five hours of night drying did what had taken 168 hours in the fall. This was a reduction in estimated fan cost from $ 100 to $ 3.

Besides very rapid drying, the increasing cold also shrinks the specific volume, increasing the fan's efficiency for moving more air per hour. An additional benefit of cooling is that it reduces the rate of metabolism in the seed germ and mold spores. This increases the allowed storage time and decreases the risk of spoilage. In addition, subsequent heating is made easier because the grain has less internal water to heat. Also night cooling creates an increased temperature differential the following day. This can further increase the efficacy of utilizing subsequent natural solar heating because it increases the rate of heat transfer. One calculation from out model indicated that continuous fan operation could require 150 hours to change the temperature of a 10,000 bushel bin one degree. A 5 to 7 degree air I grain differential could effect this temperature change in 50 hours. However, a 20-degree differential only reduced the time to 40 hours.

The point is that drying can be enhanced by the informed use of both heating and cooling. It is the objective of this art to enhance the ease and certainty of doing so. The next drawing and discussion the methods and means for doing so are outlined.

FIG. 7. The Drying Control System:

By monitoring these air-grain relationships and utilizing the natural processes as long as possible, we can increase the economy of drying. When necessary, additional intervention could be introduced to maintain control in spite of the weather. Extra fans, heaters, heat pumps, chillers, geothermal cooling, all could be added and controlled by just adding extra sensors and more columns in a spreadsheet.

The Drying Control System (D-1) is a typical, off-the-shelf, general data acquisition and control system by today's standards. The sensor types (d-2, d-3, and d-4) are intelligent and have bidirectional linkage (d-5) with the SBC (single board computer or d-6). Also each sensor has all control circuitry (d-7) and analog to digital conversion (d-8) necessary right with it to convert the parameter being sensed into information on a serial link. The microcontrollers (d-9) on the diagram are the small, cheap, PIC-type controllers for the intelligent sensing. PIC controllers are small, 8-bit controllers well known to electronic designers and readily available in the market place. The serial link to the sensors (d-5) and to the computer (d-10) may be 12C (ala Dallas) or RS-485, or wireless. The philosophy is that although this way may not be the cheapest sensor or communications cost, it affords the simplest and least expensive installation.

The scheme has a small, cheap PIC-type microcontrollers local to each sensor. The signal being sensed is digitized and put onto a two-wire serial link back to the SBC. This serial link is multidrop, so we can put as many sensors as we want on the same link. Actually, there may be a limit of 255 but that should cover even large commercial installations and can be easily increased to 65,535. Also, if an existing installation wants to add another sensing channel latter, they simply tap into the existing serial link cable and don't have to run new cabling all the way back to the SBC. Another benefit is that if, in the future, we wish to add an entirely new sensor type; we simply design the local control circuitry with a microcontroller, and connect it on the serial link with all the rest. We won't need to redesign the SBC.

There are going to be a great multitude of configurations of drying systems due to different numbers of bins, different levels of instrumentation within a bin, different drying requirements, etc. We cannot intelligently guess the maximum number of sensing channels we will need to cover all installations. With this scheme, we don't have to.

Anticipatory Calibration.

In addition, with the ability to address individual sensors, we have the ability to have 'anticipatory' calibration. When the cooling runs are to be made most often the temperature and moisture sensors that will be in the exiting air stream are at the ambient night temperature. Because the point of doing cooling runs is to utilize the stored heat in the grain to expedite drying, the initial exiting air can be warmer than the temperature of the exit sensors. This causes a condensation on the sensors, which disrupts the initial sampling. Because the initial rate of moisture removal is at the maximum, important data can be lost.

With intelligent sensing within the grain, the highest grain temperature can be detected. With small thermo-electric units (not shown) within the control circuits (d-7) of the exit sensors, we can increase the sensor's temperature so that condensation is avoided. Thus, when the cooling runs are started, important data will not be missed.

The cabling between the intelligent sensors and the SBC will also have to carry power to the sensors. Therefore, it will likely be a four-conductor cable. This approach is not the cheapest per sensor. Obviously, a microcontroller at each sensor adds cost. However, the overall cost of providing a drying control system is going to be dominated by installation labor and technical support. The sensor electronics are not going to be a large overall cost factor. We can make installation and support more efficient by spending more on the sensor electronics and reduce the overall costs of field installation. In addition, the increased quality and reliability of the sensing will increase the confidence and acceptance by the operators.

Modular Sensing Means.

The sensors can be packaged individually, mounted on probes, or fashioned into modular cables. Strong, pliable commercial hydraulic hose or the like and various electrical connectors can be joined together at intervals with unions or housings. These unions can be existing commercial connectors with 'T' configurations to match the spacing and physical needs of the sensors. This way the sensors can be placed at the needed intervals for that particular grain and its bin. With the wiring inside a hose or resilient coatings and the sensors within housings, they are greatly shielded from the abrasion of flowing grain. Since the sensors would be fitted into the unions, they would be easy to repair or upgrade. In addition, with modular cables, field installation would be easier, less coordination would be needed between warehouses an on-site installations, and greater ease created for meeting the unique needs of individual setups.

Responsive Control Means.

While this is not shown on the drawings, this art contemplates the incorporation of control means that can match the logic of dPv. For one, the control would extend to monitoring and the non-cyclic control of any heating means. This could be effected with monitoring the gas pressures for LP fueled systems and using a stepping motor for example to control the rate of heating. As will be outlined in the sectioned listing the benefits of this system approach, fuel efficiencies can be increased by the ability to have responsive and non-cyclic heating means. For means using electrical power, common state of the art techniques can be used to have a range of steady, controllable heating intensities. The logic behind this is that the common modes of the prior art either induce cyclic on and off heating, have little means of being responsive, or both. Future extension of responsive control could include means to increase or decrease the moisture inputs, fan speed and direction, heat pump or other auxiliary means, and airflow directing or recirculation.

Connecting to the Internet.

One of the marvels of current technology and a novelty I have not seen in any of the prior art for in-bin drying is the capability of connecting the sensors and controls to the Internet. This can be done with simple linkage, wire, wireless, or current carrier (d-10), of the SBC (d-6) to a PC (d-11) with the necessary modem (d-12). This creates immediate benefits. Now the supervision of the SBC/controller no longer requires repeated trips to the bin. The operator can make the decision to do a cooling run from his office or home and set the software to start and stop the fans. Further, connection to the net allows management enhancements. Should the farmer choose, he can now have the local elevator operator manage his drying or even have a distant service provider consolidate the tracking of weather changes and drying progress.

Decision Support.

Inherent in this concept is the shift in control thinking from trying to have an automatic control to using decision support and automated control. In the prior art most of the so-called automatic controllers require the operator to make uniformed decisions on running times and do so with manual input. However, as outlined in the appendix, the shear number of variables makes devising automatic control a formidable task. On the other hand, there are some vary good reasons to incorporate automated control given the richness of the current technology and its price/performance characteristics.

One of the core benefits is the enhanced access to more immediate and informed weather inputs. As mentioned earlier, enhanced efficiencies are created with informed selection of running times. In addition, an automated approach allows operators to be in the decision loop. Besides the value to the operator of feeling in control, it diminishes the amount of liability a control manufacture would have to assume. Also the number of operators that can be served via the net would allow the incorporation of very sophisticated software and high capacity servers at a reduced cost per user.

An added benefit is increased access to the bins' sensors. With off site collection of data, less on-site hardware would be needed, and it would be much cheaper to collect and store an entire sensor history. Off-the-shelf hard drives could be used that would not have to be of 'industrial' grade. This storage hardware could take advantage of economies of scale. With on going data collection, particularly from multiple sites, normative data can be collected which would add to a greater understanding of the drying process. In addition, each sensor can be tracked so that its history is captured. With each run, the collective histories can be scanned to monitor the sensor's health. One of the large failings of all the prior art is that they operate with very little memory. While is may not be as essential for moment to moment operations, no long-term data is collected. In addition, in the prior art, the operator had to be physically present to read displays or set controls. In this set up, we can have on-site manual or remote setting of control parameters.

Spreadsheets: Open-ended Means for Progressive Drying Calculations.

The math for drying can fit well into spreadsheet functions. With the power of current processing and data acquisition software, sampling can be done in near real time. In particular, because the number of sensor readings can vary with the installation, a spreadsheet has the advantage of easily being scaled upward by just using more columns. In addition, differential changes can be computed by just subtracting previous readings with current values and placing the results in an additional column. Also, the sampling times can be set for different intervals depending of the grain, the function monitored, number of sensors polled, and their response times.

The essential feature of a spreadsheet is that it is scalable. With Excel, for example, if an installation adds more sensor pairs or new controls, we just use more columns and rewrite the Macros. In addition, once the data is captured and processed, all the built-in graphics tools are available for plotting the results. By using the Macros to both calculate and plot, the data can be reduced to simple, intuitive plots. With simple menus, different plots can be utilized at will. Dashboards, simplified process displays, can be created with each bin's parameters visually displayed to make understanding even more intuitive.

With the construct of the data pair, the derived 'pair values' can themselves be paired in different combinations. By being able to use a spreadsheet, the data comparisons can be established and re-established with simple re-writing of macros. Much of the difficulties of the prior art revolved around the 'fixed comparison' structure of their logic. Now, because the calculations are simple and similar, multifunctional models are capable of simpler implementation. Also, should new values or ratios become important for monitoring and control, they to can be easily added.

FIG. 8, A General Flowchart.

The control philosophy in this art is not one of overall automatic control. There are just too many variables between operations and operators to do so (F-1). In addition, market changes can quickly change and require new objectives. Also, grain operators are independent by nature. With such a huge amount of their livelihood tied to the grain's condition, most want to stay in the control loop (F-2). This art allows for this wide range of variability and range of choice for individual operators. However, this does not mean we do not have the capability to automate several of the functions.

Data Acquisition and Process Control.

When we first began seeking funding for this project, our proposal was sent to a number of Professors of Agricultural Engineering. One made the observation that once the engineers could get the input data, the control processing would not be the problem. The implication was that the state of process engineering is that advanced. That this is true can be readily seen it the scientific literature (see technical appendix for the PALMS project).

It is the finding of this art that a system wide use of paired temperature and moisture sensors can provide the needed input information. Communications can transfer this information for processing. Conversion routines can then convert this data to a common data environment. The understanding of differential vapor pressure provides the algorithms to transform this data into quantified data streams for the process control. The actual process strategies will vary with equipment, material, location, and goals. However, the method-set for the strategies will involve the same dPv logic.

Grain Status:

The main automation is the monitoring of the grain's condition (F-3). As is well known in the art, the risk of grain in storage can be approximated by set of equations that gauges the seed's rate of respiration. I call these 'EAT' functions because the estimate the allowed time before ½ of 1% of the grains dry matter is consumed. These allowed storage time functions, however, need both a grain moisture and grain temperature for calculation. Both values must be obtained to develop an Estimated Allowed Time (EAT) index common in agricultural engineering literature. Our system of monitoring and data conversion is the only one I know of that can gather these values from non-flowing grain within the bin.

Being able to compute this index has several benefits. One of the main values is in risk assessment. This aids the operator in knowing how rapidly he must dry a particular bin. With estimates of long storage times he has more time to wait on good weather. Also, in this light, what-if calculations can be made projecting the potential benefits of various weather and grain combinations. 'Before and after' projections can help the selection of running times.

In addition, by computing the dollar value of the ½% dry matter loss for each bin, an EAT$ function can be developed. This gives a cost per day for the corresponding EAT index. This gives the operator an indication of his management strategies. Since the EAT index is quite sensitive to grain temperature, this gives added stimulus for maintaining the stored grain at lower temperatures. Conventional operations tend to ignore this facet of management because of their singular focus on heat-only drying.

F4 is a set of macros that supervise the status of the grain. These routines can be polled at will but are primarily set to flag changes outside of predetermined temperature and moisture levels. Once a change has been detected, a call to the designated operator is made (F-5). If the change has been anticipated, the operator may be a supervisory software routine. However the calling routines are designed to insure action is taken on the call.

By already having a 'Common Data Environment' and having reduced weather to fluctuations of temperature and moisture, the grain's status and current weather are easy to see. With computing and the algorithms of this art, these values can now be quantified. With the connection to the net, this data is easier to be shared and the number of consolations expanded. Once the operational decisions have been made, it is contemplated that the software will be able to start the fans on the desired temperature 'gap', shut them down when the warming or cooling efficiencies decline, and then present a desired data summary.

Optimization:

The most substantial advance of this art over that of the prior art is the fundamental integrative understanding of the principles of dPv. From this understanding proceeds understanding the need to gather data in pairs of independent temperatures and moistures system wide, create a common data environment, and quantitate the relationships. Out of this understanding come new methods for drying. Out of further research and experience will come even better strategies of using these methods.

The most substantial advance of these procedures is that our system can truly optimize. By being able to 'see' inside the bin both vertically and horizontally, we can monitor rates of change both during drying and for storage. Therefore we can directly tie our responses to the grains condition. We can quickly act to ward off creation of gradients with small preventive runs or, if the grain is OK, avoid running until necessary. With data in a common format, it is easy to avoid running until drying would occur. With exit sensing, it's easy to stop when water is no longer being removed. In addition, with communication and the ability to gauge the incoming weather, a 'good' day can be passed up for a 'better' day. As mentioned earlier, this can mean the difference between 6 lb. of water per hour vs. 460 lb.

Benefits:

With our combination of sensing, computing, algorithms, communications, and understanding of differential vapor pressure, a number of new methods become possible. First, we have the precision of drying that comes with the increased information. Second, we have the ability to promote drying with both heating and cooling in an ongoing manner. This greatly expands the options for natural drying, both decreasing costs and increasing quality. In addition, the same principles can be utilized with heat pumps and heating if drying needs to be accelerated.

For now, suffice it to outline the goals and benefits of these possibilities.

F-6, Warm and dry: This is the most conventional of the methods but our research sheds light on some of the non-obvious factors involved. In conventional practice the fans are often run continuously. With continues running, the temperature differential at any given time can be quite small. As mention earlier, a temperature differential of 5 to 7 degrees is efficient and provides the 'gap' close to the desired equilibrium moisture. Temperature differentials above this suffer from diminishing return. In addition, gentler heating is much better for the quality or the grain.

By staring the heating when the air exceeds these small differentials, be can maximize the amount of natural heating. By determining the rate the grain is heating, we can responsively increment the heat another 5–7 degrees when the rate of natural temperature rise decreases. We thus avoid the expense and harshness of high heat differentials. We can match the grain needs with the current weather highs and the predicted lows. Because our model indicates the diminishing returns of constant heat, we only increase the grain temperature to a point. We work to optimize this level of temperature rise by jointly estimating the drying which could latter occur with strategic cooling. The goal is to increase the grain's temperature for only a short while and then only to the point that maximizes the latter cooling effects.

Because the temperature fluctuations of natural air are usually gentle, we do not stress or over dry the grain. Then in the cool of the evening or night, during off-peek times, cooling not only can dry more efficiently, but the cooling itself lowers the grain's storage risk. With the ability to lower storage risk with cooling, we increase the time for utilizing natural air, particularly in the Mid-west. In addition, as water is removed during the cooling phase, the grain requires less thermal input to re-heat in a following cycle.

F-7 Wet Warming:

One of the major novelties explainable with dPv logic is a procedure called 'wet warming'. Often times warm fronts with the more desirable temperature rises also have quite high in moisture content. In the prior art, automatic controllers or controllers based on differential humidity would shut off. With our extended monitoring and knowledge of dPv, however, we can use these fronts to our advantage.

By choosing moist air that in fact would retard the ability of the grain to loose moisture, more of the heat can be transferred to raising the grain's temperature. As the grain is being heated, the internal vapor pressure is also increasing.

Thus as the temperature of the grain increases, so does its resistance to further re-wetting. Knowing this, we can utilize warm air whose moisture level is even higher than that in the grain. With increasing grain temperature comes an increased internal vapor pressure. With increased internal vapor pressure and the use of subsequent cold, dry air, drying is accelerated naturally and efficiently.

F-8 Internal Control for Maximum Heating: Another Major Novelty.

There are times when the grain is just too wet to be slowly dried. However, the need is to control the rate of heating so as to maximize the temperature increase without causing re-wetting in the upper layers. Our system is able to do this because we can determine the dew point temperatures of the warmed air rising within the bin plus the colder grain temperatures in the upper layers. With this information and feedback for the heating temperature, we can confine the rate of temperature increase to avoid condensation within the grain mass.

F-9 Incremental Drying:

A truly novel benefit of our system is its ability to control the internal rate of drying. O. R. Kunze, in a 1979 paper for Transactions of the ASAE, "Fissuring of the Rice Grain After Heated Air Drying",on page 1198 writes that "Rice dried from 20% to 13.5% moisture could be dried with minor cracking effects if dried at a maximum rate of 1.5% moisture removal per hour." Latter, he adds that 1-percent change in moisture induces 100 times the stress as that of a 1-degree Centigrade change. So if the rate of drying can be held at 1 to 1.5%, significant reductions of stress cracking in rice can occur. Other systems attempt to do so but they lack the needed feedback. These systems monitor inlet and outlet grain or airflows and assume the rates of change are linear. Our research and that of others has shown that the rates of change are very non-linear.

Grid Awareness.

The monitoring of non-linear change requires more that one or two sensor points. It requires paired temperature and moisture means (cable or probes) in a fine enough grid to discern these non-linear changes. The actual number of pairs needed will vary with the equipment, grain mass, and airflow. However, our means of sensing is the only way I know of having the necessary information to so control the drying. Here again, our ability to gather the incoming weather fluctuations and couple this information with the internal changes is unique in the literature. An additional form of 'grid awareness centers on the time intervals of sampling. As discussed in our initial experiment, the thinking generated by the focus on equilibrium tended to dismiss initial sampling of changes. However, because these changes are rapid and non-linear they need to be sampled much more often than was common. The exact rates will vary with the grain, its depth, and the airflow. However this, the assumption of linear change, and the use of only inlet and outlet grain moisture sampling, and the high temperatures in the commercial dries is the root of much of their energy waste and quality loss.

F-10 Specified Equilibrium Drying and Aeration:

The deficiency in the prior art of the equilibrium controllers was that they were based on RH. With the precision of our input we can do what they attempt to do but more. We not only can pick times in equilibrium with a target grain moisture; we can choose our targets at will. For example, in the above case of rice drying, the rate of water removal has to be carefully controlled. We can pick or condition air to be just 1% below the wettest grain. Many rice farmers now do this by running the grain through high volume dryers several times. This is called multi-pass drying. Our system can do this with the grain in the bin. This decreases the need for extra handling and avoids the subsequent physical grain damage.

A common problem in the Mid-west is overdrying the bottom and leaving the top too wet. Another novel feature of out system is that we can exclude running 'too dry of air'. The past art did not have this control. In addition, we can go further. We can select air that can rewet the bottom while drying the top.

F-11 Cool and Dry:

One of our most novel findings is that drying can be augmented by the planned and repeated use of cooling. The reasoning is as follows.

At night, or better, at night when a cold, dry front is coming in and cold air is blown into warm grain, the grain becomes the heater of the incoming air. As the grain warms the air, the volume of the air expands. Thus the already low concentration of moisture now becomes even lower. All the sensible heat to heat the air comes form the grain and all the heat to vaporize the water is from the grain. This can result in at least a three-fold increase in efficiency. Very importantly, the air is never heated above the grain temperature or made 'wetter' than the grain's moisture. (It can not attain a higher vapor pressure than the grain's vapor pressure in the upper layers). As this air then exits, all the moisture that evaporated remains in the exiting air and does not re-condense in the upper grain layers.

In reverse, if cold grain were being intensely heated, the grain at the bottom would dry first, but as the hot, moist air rose through the cold upper layers, much of it could re-condense and have to be re-evaporated, maybe several time over.

F-12 Ventilate to Even Grain Temperatures—Avoiding Moisture Migration:

During winter storage, the temperature differentials can build up between the center of the bin and the grain near the bin wall. If this is allowed to develop long enough, convection currents develop that flow down the colder bin walls to ascend upwards through the center core. Just as in our planned cooling, this colder air is warmed, expands, and moves upward. However, when this warmer, wetter air comes in contact with the colder, upper layers of grain, the moisture re-condenses. If undetected, this transferred moisture can induce spoilage with spring warm up.

By being able to monitor the changes between the center of the bin and the most exposed wall, these changes can be detected before they become large. Running the fans to eliminate the temperature gradients halts the process.

F-13 Ventilate to Profile:

The controls can be set to 'profile' the grain condition. This is a procedure in which the fan's 'operating window' or range of temperature and moisture settings would be selected to closely match the grain's current condition. When these conditions would occur in the ambient, the controller would start the fans and record the sensor data rapidly, perhaps by the minute or less. The resultant data output would then be compared to the inputs. In this way, the overall grain condition can be checked at will and without the arduous and sometimes hazardous climb to the top of the bin needed in the prior art. It must be added, however, that this air profiling can not substitute for in bin sensing. Hot spots can develop under the surface of the top layer but their detection masked by the overall mass of airflow.

However, a more fundamental benefit comes from the data that this profiling can generate. When used in laboratory settings, with fixed air flows and grain masses, known grain moistures, and the Dry Bulb and Dew Point data, controlled studies could map the changes in the Pv maps of FIGS. 3 through 4 and map the changes in the grains specific heat. Thus scientific studies could be made of the different drying rates of individual varieties. Also different combinations of growth history, maturity, damage, and grain condition could be evaluated experimentally. With this base data, different hybrids could be evaluated for ease of dry down. It would also provide more data for estimating the rates of response to different air combinations.

Analysis of in-field data could help determine air/grain responses and the times to F4 equilibrium for individual bins. This would address the problems discussed in the technical section of having different varieties, maturates, and moistures with the same bin. It allows tracking of the drying fronts, detection of layers at higher moistures or temperatures, and the overall progress of the drying and status of the storage. I know of no other approach that addresses these problems with the information feed back of our system. Many bins have temperature cables and grain samples can be obtained from portions of the grain, but temperature does not track moisture and moisture can quickly change with exposure to the air.

F-14 Re-wetting Grain:

Sometimes the grain has been overdried and thus will bring less when sold. However, the Federal Grain Inspection Service issued a new clarification in 1997. It is now legal to use aeration to add moisture back into overdried grain. This will add even more incentive for grain farmers to use controllers. However, according to Dirk Maier, Extension Agricultural Engineer at Purdue University, "the weather, grain condition, airflow rate and direction, and available time need to be understood to succeed",(Successful Farming, August, 1997, page 64.) Our system is one of the only systems that incorporate this amount of processing and control.

What is claimed is:

1. A method for treating material with gas or vapor contact for drying and conditioning of grain in a bin comprising:
   gathering data from the grain, air within the bin, air entering the bin, and air exiting the bin such that said data are convertible to Dry Bulb (DB) and Dew Point (DP) values, said data being obtained at predetermined intervals of time and space from a plurality of sensors, each of said plurality of sensors configured to measure temperature and moisture;
   establishing a system-wide common data format for the air, gas, vapor, and materials values;
   integrating said data with the quantitative algorithm of direct differential vapor pressure analysis;
   conditioning the grain in response to results obtained from the quantitative algorithm of differential vapor pressure analysis.

2. The method according to claim 1, wherein said data are gathered electronically by remote sensing.

3. The method according to claim 2, wherein said remote sensing is a part of modular cabling or probes.

4. The method according to claim 1, wherein those of said plurality of sensors within the bin are placed at vertical and horizontal grid points.

5. The method according to claim 1, further comprising measuring rates and times of temperatures and moistures approaching or departing from states of equilibrium of air and grain within a common data environment.

6. The method according to claim 1, further comprising, converting dry bulb and dew point data to dry bulb and relative humidity values, and obtaining equilibrium moisture contents.

7. The method according to claim 6, further comprising, converting equilibrium moisture content and grain temperature to an estimated allowed times index.

8. A method for drying and conditioning of grain in a bin comprising:
   positioning a plurality of sensors, each of said plurality of sensors configured to measure temperature and moisture;
   gathering data from the grain, air within the bin, air entering the bin, and air exiting the bin such that said data are convertible to Dry Bulb and Dew Point values, said data being obtained at predetermined intervals of time from said plurality of sensors;
   establishing a system-wide common data format for the air, gas, vapor, and materials values;
   integrating said data with the quantitative algorithm of direct differential vapor pressure analysis;
   conditioning the grain in response to results obtained from the quantitative algorithm of differential vapor pressure analysis, said conditioning chosen from the group consisting of warming and drying, maximum warming, wet warming, incremental drying, specified equilibrium moisture content drying, cooling and drying, ventilating to even grain temperatures, ventilating to profile test, and re-wetting.

9. The method according to claim 8, wherein said data are gathered electronically by remote sensing.

10. The method according to claim 9, wherein said remote sensing is a part of modular cabling or probes.

11. The method according to claim 8, wherein those of said plurality of sensors within the bin are placed at vertical and horizontal grid points.

12. A method for drying grain in a bin comprising:
   use of sensors to determine moisture and temperature of the grain and air entering, inside, and exiting the bin; and
   conditioning or selecting the air entering and inside the bin such that
      the air entering and inside the bin is configured to be warmer than the grain and whose temperature differential with the grain is between 5–7° F. is used to warm the grain, and controlling the rate of heating the grain such that the temperature difference between the grain and air inside the bin is prevented from becoming so great that moisture expelled from relatively warmer grain is prevented from condensing on cooler grain,
      the air entering and inside the bin is configured to hold more relative moisture than the grain and whose temperature differential is greater than 5° F. to warm the grain, and controlling the rate of heating the grain such that the temperature difference between the grain and air inside the bin is prevented from becoming so great that moisture expelled from relatively warmer grain is prevented from condensing on cooler grain, or the air entering and inside the bin obtains a state of being colder and holding less moisture relative to the grain.

13. The method according to claim 12, wherein the air entering and inside the bin is conditioned or selected such that the air inside the bin obtains a state of holding more relative moisture and having a temperature differential greater than 7° F. to warm the grain, and controlling the rate of heating the grain such that the temperature difference between the grain and air inside the bin is prevented from becoming so great that moisture expelled from relatively warmer grain is prevented from condensing on cooler grain.

14. The method according to claim 12, wherein said data are gathered by remote sensing.

15. The method according to claim 14, wherein said remote sensing is a part of modular cabling.

16. The method according to claim 12, wherein those of said plurality of sensors within the bin are placed vertical and horizontal grid points.

17. A method for treating material in a bin with gas or vapor contact comprising:

gathering data specific to the bin in regards to physical dimensions, filling means and rates, size of fans, and the volume of air-flow in time or cfm per bushel, atmospheric pressure at the bin site, and the relevant ratio for the vapor or gas constants;

gathering data specific to the grain being dried in regards to mass per bushel, volume of grain or number of bushels, percent grain moistures, historical equilibrium equations, and predetermined equations for the change in the specific heat of the grain as grain moisture changes;

entering data as pairs of temperatures and moistures, either sensed or converted to independent values of dry bulb and dew points, in the ambient air, within the grain, and of the exiting air;

calculating from said pairs of data values resultant vapor pressures and absolutes humidities;

converting said dry bulb temperatures of standard scale into absolute temperature values to derive specific volumes;

converting the volume of air-flow per unit time, the number of bushels being examined, the specific volumes, and the time interval being considered to derive the Mass of air-flow per unit time;

deriving mass of water removed or added from the differences in said absolute humidities multiplied by said mass of air-flow per unit time;

calculating the enthalpy of the latent heat of said air by multiplying the computed water removed value by the latent heat of vaporization at said air temperature;

calculating enthalpy of sensible heat by multiplying the computed air mass by the bushels and the mass per bushel, multiplying by the said specific heat of the grain, and multiplying by the considered temperature differential;

calculating enthalpy of sensible heat by multiplying the computed air mass by the specific heat of air and by the considered temperature differential;

deriving a time to temperature equilibrium with regard to a source of thermal change, cooling warm grain with colder air having a dew point less than or equal the dew point measured within the grain, by dividing the enthalpy of the grain by the sum of the enthalpy of the sensible heat plus the enthalpy of the latent heat, or heating cold and wet grain with warm air having a dew point permitting evaporate cooling by dividing the sum of enthalpy of the graining and the enthalpy of the latent heat by the enthalpy of the sensible heat.

18. The method according to claim 8, further comprising measuring rates and times temperatures and moistures approaching or departing from states of equilibrium of air and grain within a common data environment.

19. The method according to claim 18, further comprising, converting dry bulb and dew point data to dry bulb and relative humidity values, and obtaining an equilibrium moisture contents.

20. The method according to claim 19, further comprising, converting equilibrium moisture contents and grain temperatures to an estimated allowed times index such that the grain loses ½ of 1% of its dry matter.

21. The method according to claim 20, further comprising, computing a monetary value of ½ of 1% dry matter loss for the bin, dividing said monetary value by a number of estimated days, setting this value as a daily cost for dry matter loss.

22. The method according to claim 8, further comprising, connecting said plurality of sensors and controls via wire or wireless communication to a processing mechanism at a local display, network, or the Internet.

23. The method according to claim 22, further comprising converting distant incoming weather patterns gathered via the Internet into a series of dry bulb and dew point values.

24. The method according to claim 22, further comprising, remotely storing data of common data environments from at least one bin.

25. A method for drying grain in a bin comprising:

using a plurality of sensors to determine temperature and moisture of the grain, air entering the bin, air inside the bin, and air exiting the bin;

conditioning said air entering the bin in response to predetermined temperature differentials to respond to grain temperature changes; and preventing moisture expelled from the grain from re-condensing on the grain.

26. The method according to claim 25, wherein said plurality of sensors are configured to measure temperature and moisture at predetermined intervals of time at points disposed vertically and horizontally in the bin.

27. The method according to claim 26, wherein said air entering the bin is conditioned preceding cool drying to suppress evaporative cooling and increase heat transfer.

28. The method according to claim 26, wherein said air entering the bin is configured to be cooler and drier than the grain.

29. The method according to claim 26, wherein said air entering the bin is configured to reduce temperature differentials within the bin.

30. The method according to claim 29, further comprising, connecting said plurality of sensors and controls via wire or wireless communication to a processing mechanism at a local display, network, or the Internet.

31. The method according to claim 30, further comprising, remotely storing data of common data environments from at least one bin.

32. The method according to claim 31, further comprising, conditioning said air entering the bin to have vapor pressure to re-wet the grain.

33. The method according to claim 8, further comprising, conditioning said air entering the bin to control the removal of a predetermined amount of moisture over a predetermined time interval.

34. The method according to claim 8, further comprising, conditioning said air entering the bin to disturb equilibrium states, measuring resulting changes, storing said resulting changes, and deriving data specific to the grain being processed.

* * * * *